United States Patent [19]

Davis et al.

[11] Patent Number: 5,365,577
[45] Date of Patent: Nov. 15, 1994

[54] TELECOMMUNICATION DISPLAY SYSTEM

[75] Inventors: Richard A. Davis, Boulder; Ronald K. Witmore, Lafayette; Charles J. Fette, Parker; Anthony J. Brittain; Peter Mathys, both of Boulder, all of Colo.

[73] Assignee: Radish Communications Systems, Inc., Boulder, Colo.

[21] Appl. No.: 877,328

[22] Filed: May 1, 1992

Related U.S. Application Data

[63] Continuation-in-part of Ser. No. 589,203, Sep. 27, 1990, Pat. No. 5,164,982.

[51] Int. Cl.$^5$ ............................................. H04M 11/00
[52] U.S. Cl. ....................................... 379/96; 348/17; 375/8
[58] Field of Search ................. 379/90, 91, 93, 96–98, 379/100, 53, 54; 375/8, 13; 358/85; 348/14, 15, 17, 18

[56] References Cited

U.S. PATENT DOCUMENTS

| | | | |
|---|---|---|---|
| 4,071,697 | 1/1978 | Bushnell et al. | 379/91 |
| 4,387,271 | 6/1983 | Artom . | |
| 4,578,535 | 3/1986 | Simmons | 379/93 |
| 4,581,484 | 4/1986 | Bendig | 379/96 |
| 4,608,686 | 8/1986 | Barsellotti . | |
| 4,656,654 | 4/1987 | Dumas | 379/96 |
| 4,659,876 | 4/1987 | Sullivan et al. . | |
| 4,660,218 | 4/1987 | Hashimoto | 379/93 |
| 4,700,378 | 10/1987 | Brown | 379/96 |
| 4,715,059 | 12/1987 | Cooper-Hart et al. | 379/53 |
| 4,723,268 | 2/1988 | Newell et al. . | |
| 4,734,780 | 3/1988 | Iwata et al. | 375/13 |
| 4,788,682 | 11/1988 | Vij et al. . | |
| 4,815,121 | 3/1989 | Yoshida . | |
| 4,827,085 | 5/1989 | Yaniv et al. . | |
| 4,845,636 | 7/1989 | Walker | 379/53 |
| 4,908,851 | 3/1990 | Kotani et al. . | |
| 4,932,047 | 6/1990 | Emmons et al. | 379/98 |
| 4,995,048 | 9/1990 | Iwamura et al. | 379/53 |
| 4,999,716 | 3/1991 | Nakamura | 379/100 |
| 5,164,982 | 11/1992 | Davis | 379/96 |

FOREIGN PATENT DOCUMENTS

| | | | |
|---|---|---|---|
| 1-288049 | 11/1989 | Japan | 379/100 |
| 2052122 | 1/1981 | United Kingdom | 379/100 |

OTHER PUBLICATIONS

"Luma TM: The Phone That's Not All Talk", *Telephony*, Dec. 29, 1986, p. 19.
W. J. Hawkins, "For-Your-Home Videophones", *Popular Science*, mar. 1988, pp. 60–62, 107.

*Primary Examiner*—Wing F. Chan
*Attorney, Agent, or Firm*—Dorr, Carson, Sloan & Peterson

[57] ABSTRACT

A telecommunication system provides voice and data communications over a conventional telephone line that can be dynamically switched from voice mode to data mode during a single conversation. Each station includes a telephone for voice communications and bypass relay means for selectively connecting the telephone to the telephone line in voice mode and disconnecting the telephone while operating in data mode. Prior to transmitting data, the originating station first transmits a start signal over the telephone line that includes a rate signal indicating one of the several possible data transmission rates. If a station detects a start signal transmitted by a remote station, a microcontroller directs the bypass relay means and modem to automatically switch from voice mode to data mode in preparation for receiving data from the originating station.

83 Claims, 19 Drawing Sheets

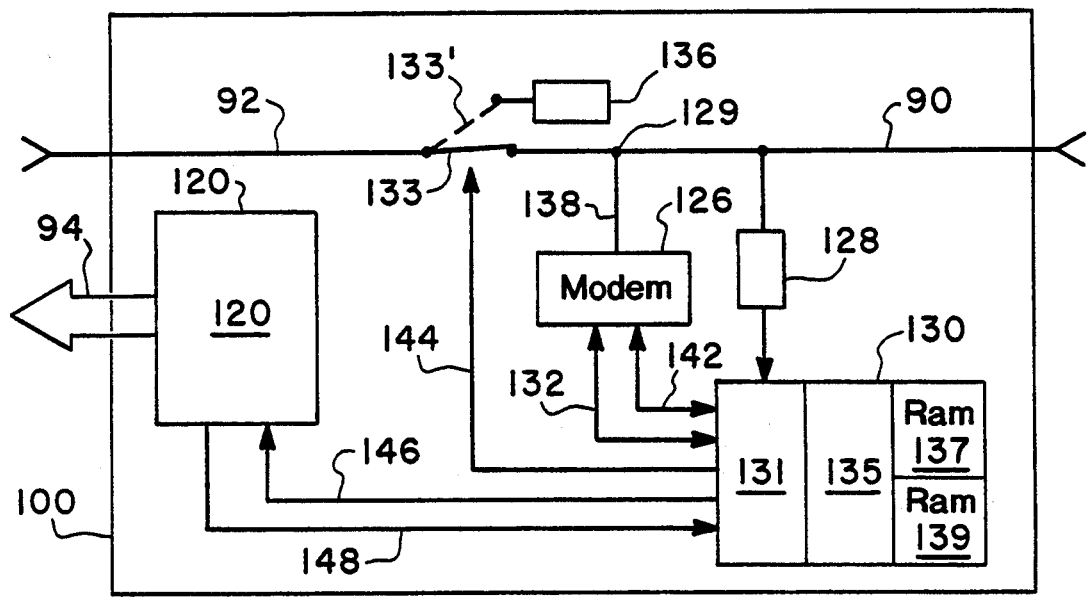
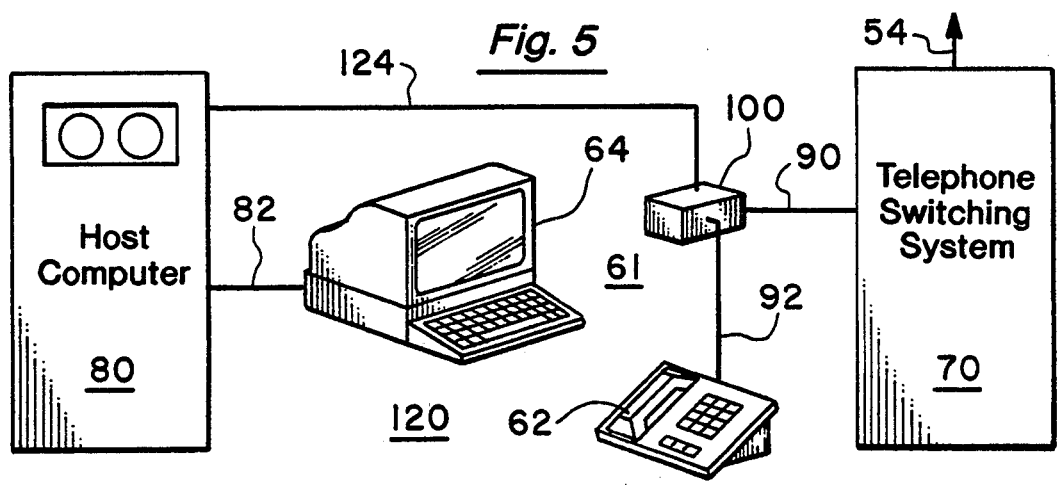
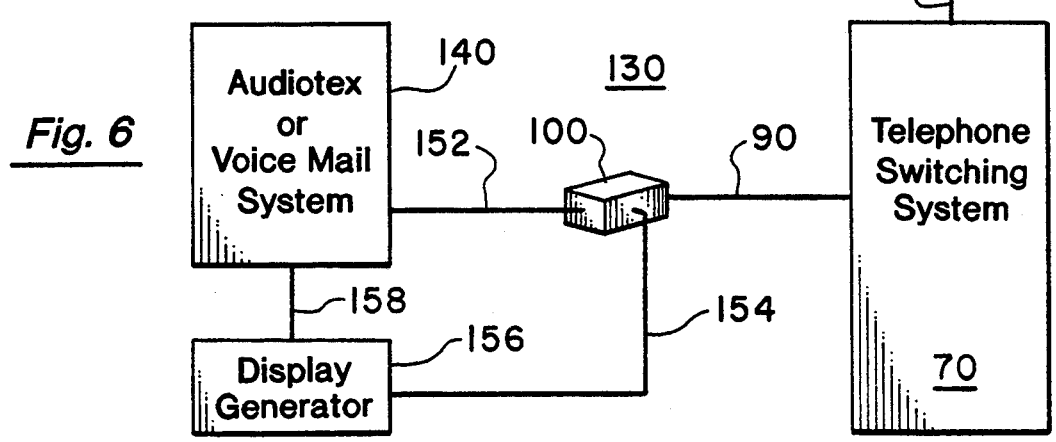

Fig. 26
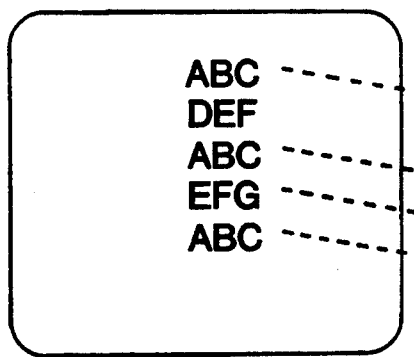
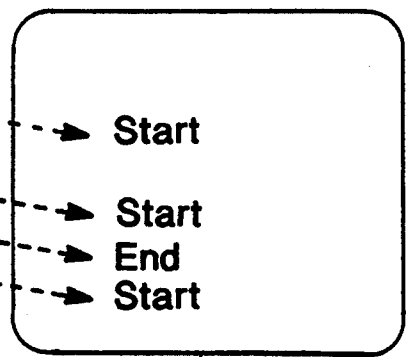
Source Display — 522
Target Display — 520
Source: ABC, DEF, ABC, EFG, ABC
Target: Start, Start, End, Start
Fig. 27
Source Display
```
xyz
abcdefgh
1234567890
xyz
```
524
522
Target Display
524
```
xyz
abcdefgh
1234567890
xyz
```
520
Fig. 28
Target Display
TITLE - - - - - ► TITLE
520

TELECOMMUNICATION DISPLAY SYSTEM

CROSS-REFERENCE TO RELATED APPLICATIONS

This application is a continuation in part of the parent application, Ser. No. 07/589,203, now U.S. Pat. No. 5,164,982, entitled "Telecommunication Display System", issued on Nov. 17, 1992.

BACKGROUND OF THE INVENTION

1. Field of the Invention

The present invention relates to telecommunications systems and more specifically to a telecommunications system adapted for transmission of speech and display data over standard, existing telephone lines for audiographic communication between parties

2. Description of the Prior Art

It is often desirable to be able to transmit a visual image of data being discussed by parties over a telephone line concurrent with the verbal discussion. For example, a travel agent might wish to show a telephone customer a travel itinerary as they are discussing it, or a broker might want to show a customer a visual confirmation of a financial transaction, which the customer has just made orally over the telephone. Facsimile devices for transmitting data over telephone lines and displaying it for a receiving person in visual form are well known. However, such facsimile technology does not accomodate situations where the supplier of information needs instantaneous transfer of data for visual viewing by a receiver (customer) directly during the telephone conversation.

There are several devices that purport to allow alternate voice and visual display data via telephone lines for special purpose applications, but none of them really provide a general, user friendly system. Lacking is a system in which an agent can intersperse visual display transmissions over the same telephone to a user or receiver between sentences in a voice conversation almost on a real time basis and within the time constraints of natural pauses in the conversation so as to not be disruptive of the conversation.

The U.S. Pat. No. 5,465,654, issued to Neil S. Dumas, describes a more complex conferencing system in which both the agent and the receivers have personal computers and speaker phones, and either one of them can interrupt voice communication through the speaker phones to send data from one personal computer to the other. However, that system is not particularly user friendly, requiring the agent and the receiver to be computer literate enough both to go through a fairly complex set of menu selections, and the visual data transmission requires a quite significant pause or interruption in the voice conversation.

The Cooper-Hart U.S. Pat. No. 4,715,059, and Walker U.S. Pat. No. 4,845,636, both transmit images captured by a video camera during a voice communications. The Brown U.S. Pat. No. 4,700,378, is an example of a system in which a user or receiver wants to access a data base to receive visual data displays via telephone lines and is prompted by a voice synthesizer at the data base operator to press certain telephone touch tone buttons to do so.

There are also several devices that can switch between modes automatically, such as: U.S. Pat. No. 4,815,121, entitled COMMUNICATION APPARATUS RECOGNIZING SPEECH AND AUTOMATICALLY SWITCHING FROM DATA TO SPEECH TRANSMISSION, issued in the name of Yoshida on Mar. 21, 1989, and assigned to Canon Kabushiki Kasisha, and U.S. Pat. No. 4,908,851, entitled FACSIMILE APPARATUS OPERABLE IN FACSIMILE OR CONVERSATION MODE, issued in the name of Kotani et al., on Mar. 13, 1990, and assigned to Sharp Kabushiki Kaisha. Yoshida solves the problem of selectively switching between the data and speech transmission by use of a voice detector. Kotani et al. automatically switches over to voice when the standard facsimile hand shake signals are not received. However, these devices are not conducive to multiple switching back and forth concurrent with on-going voice communications, and they still can leave the less sophisticated users bewildered.

Simultaneous with the upsurgance of new telephone equipment was the development and popularization of the personal computer and modems, which facilitate the transmission of digital data between computers over standard telephone lines. However, modems do not, in and of themselves, solve the problem of obtaining and displaying data for the average telephone user. These modems are often associated with extensive equipment including computers and display terminals, and they still require relatively sophisticated levels of understanding and abilities to use them. Also, as with facsimile machines, not all modem users are in a position to have a dedicated telephone line for data only. Switching between normal voice telephone line usage and data transmission usage can be done, for example, as taught by U.S. Pat. No. 4,723,268, entitled DUAL MODE PHONE LINE INTERFACE, issued in the name of Newell et al. on Feb. 2, 1988, and assigned to International Business Machines, which includes a method of providing the required FCC billing delay for auto answer modems that can be selectively switched between human answer telephone set modes and modem modes.

Modems with their ability to communicate digital data over telephone lines have opened up a whole new world of information exchange. An example of some of the possibilities were contained in U.S. Pat. No. 4,387,271, entitled COMBINED TELEPHONE AND DATA-TRANSFER SYSTEM, issued to Artom, on Jun. 7, 1983, and assigned to CSELT Centro Studi e Laboratori Telecomunicazioni S.p.A. Artom describes subscriber controlled receipt of information by a telephone receiver, a personal computer, and a television by way of a local telephone line. Artom offers some wonderful possibilities for the future of home entertainment and information systems, however such total systems can be rather costly, complex, and still require a fair amount of expertise to operate.

A patent by Barsellotti incorporated a modem internal to a telephone unit for the purposes of receiving and displaying limited visual data, such as the telephone number called. This Barsellotti patent, U.S. Pat. No. 4,608,686, entitled TWO WIRE VOICE AND DATA SUBSCRIBER LOOP, issued to Barsellotti, on Aug. 26, 1986, and assigned to the Mitel Corporation, was a step in the right direction. However, once again, it requires special, complex, and expensive equipment.

In a concept similar to Barsellotti, Vij et al. provided a telemarketing system in which a telemarketing switching network can distinguish between several incoming lines. With this device, as disclosed in U.S. Pat. No. 4,788,682, entitled TELEPHONE SYSTEM ADAPTED TO TELEMARKETING, issued to Vij et al., on Nov. 29, 1988, and assigned to Northern Telecom Limited, product information associated with a particular phone number can be transmitted to a telemarketing agent along with the call itself.

Several other inventions have also addressed some special aspects or problems in combining voice and data transmissions. For example, U.S. Pat. No. 4,827,085, entitled VOICE AND IMAGE TELECONFERENCING SYSTEM INCLUDING PAPERLESS FACSIMILE MEANS, issued to Yaniv et al., on May 2, 1989, and assigned to Ovonic Imaging Systems, Inc., describes a touch-sensitive display screen with a typical teleconferencing phone, which allows users to sketch a drawing by touching a screen and then transmit that sketch to another user with a similar device. Another patent that extended this idea of combined voice and data communications is U.S. Pat. No. 4,659,876, entitled AUDIOGRAPHICS COMMUNICATION SYSTEM, issued to Sullivan et al. on Apr. 21, 1987, and assigned to SPI Soft Pac International. This Sullivan et al. patent shows combined interactive graphics and audio communication with computer-like display screens on telephones. As with many previous devices, this Sullivan et al. invention requires rather expensive, complicated equipment to replace existing conventional voice communication telephones, and it requires two users of relatively equal and high level sophistication, both with the same equipment.

Consequently, while there are many new innovations in telephone and computer equipment and technologies relating to concurrent voice and data transmission, they either require relatively sophisticated users and special, complex and expensive equipment or they lack high quality, reliable, and nonobtrusive performance qualifies necessary to make them widely acceptable and useable to a wide range of consumers. Such equipment often is designed to replace conventional voice telephone devices as opposed to merely adding to them, and those users who possess an anti-computer bias, cannot afford such high-tech equipment, or for whatever reasons are either unable or simply not interested or willing to acquire the necessary expertise or equipment, are essentially left out. As a result, there was, prior to this invention, still not any equipment available that enabled a person to receive and view visual data over the telephone line concurrent with voice conversation, while interacting with a person who wants to transmit such visual data, and using equipment which allows the receiving party to remain almost completely passive in the visual data transmission process and in the use of the equipment. Thus, prior to this invention, there was nothing available, for example, to allow a travel agent to display a travel itinerary or a broker to display the details of a financial transaction almost instantaneously and concurrently with voice communications over the telephone lines to an average telephone user.

SUMMARY OF THE INVENTION

Accordingly, a general object of the present invention is to provide a communication system which is capable of providing a more efficient, faster, less expensive, and less error-prone exchange of information.

Another object of the present invention is to provide a telephone system for both audio and visual transmission which requires less equipment and only equipment of a less complicated nature from the receiver's standpoint than heretofore available.

Further, it is an object of this present invention to provide a telephone system with greatly expanded data display capabilities and possibilities, such as access to enormous databases, despite having fewer and less complicated pieces of equipment.

It is yet another object of the present invention to provide a telephone system in which a receiving party can be provided with both audio and visual access to information and data bases, or merely to get visual confirmation of transactions without requiring that receiving party to be skilled in the use of computers or possess expensive and complicated equipment.

A more specific object of this invention is to provide a telemarketing or other consumer access system that combines all databases, despite having fewer and less complicated pieces of equipment.

It is yet another object of the present invention to provide a telephone system in which a receiving party can be provided with both audio and visual access to information and data bases, or merely to get visual confirmation of transactions without requiring that receiving party to be skilled in the use of computers or possess expensive and complicated equipment.

A more specific object of this invention is to provide a telemarketing or other consumer access system that combines all the advantages of interacting with a live agent or service provider with a visual display of information or data useful to a caller.

A further object of this invention is to provide a visual data access system for consumers that is truly "user friendly" by combining speed and accessibility of computer technology and data transmission and display with concurrent human voice interaction wherein the sender controls and operates the visual data transmission and the receiver simply views it.

Still further, it is an object of the present invention to provide such a telemarketing system which can utilize and take advantage of the existing conventional telephone equipment of both the service provider and a consumer or caller.

To achieve the foregoing and other objects and in accordance with the purpose of the present invention, as embodied and broadly described herein, the system and apparatus of this invention may comprise a subscriber or receiver station in which a display terminal is added to a conventional telephone or other voice communication equipment. Such display terminal, which may be in the form of a matrix liquid crystal display (LCD), cathode ray tube (CRT), or other display technology, is capable of receiving text, graphics, and picture data. The display terminal is also essentially "dumb" to the receiver in that it is almost entirely controlled from a remote location, such as an agent position, which allows the receiver to be almost completely passive and inactive in the visual data transmission. The subscriber position may additionally include a voice/data selector, either as an integral portion of the display terminal or as a separate device. The voice/data selector is capable of selectively connecting the typical incoming telephone line to the subscriber telephone or the subscriber display terminal The remote location agent position is similarly equipped with a telephone or other voice communication device and a display terminal, which is usually in the form of a personal computer or other data terminal. The agent display terminal may further be tied into a larger main frame computer, which the agent may utilize for storage, generation, or transmission of data.

Also, the method of this invention can begin with establishment of a voice communication between subscriber and agent over the respective telephone devices. This transaction between agent and subscriber can be accomplished using existing, standard telephone lines. At a desired time during the course of the conversation, the agent can interrupt the telephone conversation momentarily and transmit display data to the subscriber display terminal, also over existing, standard telephone lines. It is preferred that this display data be encoded in some standard digital code, such as any of the large number of graphics and text protocols, or any software compatible code such as ASCII. This transmission of display data requires no effort or input from the subscriber beyond mere possession of the display terminal. Following the transmission of display data, the voice communication linkage may be automatically re-established, while the displayed data is retained.

The display data may be in the form of existing pre-established patterns such as advertising, trademarks, option menus, price lists, news, or announcements. However, this display data may also be dynamically constructed by the agent during the telephone conversation. Such dynamic display data might include, for example, a travel itinerary, individualized grocery order lists with associated grocery item prices, purchase options, business or financial data, visual confirmation of verbal transactions or orders, or even medical information.

During the typical voice communication, the voice/data selector may be defaulted to the telephone. However, the voice/data selector constantly monitors the incoming signal on the telephone line. When a particular tone sequence or other signal is detected indicating the beginning of a transmission of display data, the voice/data selector can automatically switch the incoming data stream to the display terminal. Following the transmission of display data the voice/data selector can automatically switch back to the telephone for continued voice communication.

In the preferred embodiment, the agent is human, creating a friendly, personal interface between the subscriber and the database of information sought. However, the agent may also be a computer in which the transaction between agent and subscriber is provided according to a preestablished program or which is conducted through subscriber selection of menu options displayed on the subscriber display terminal, from the computer. In the latter case, the subscriber may enter his or her selection by means of pressing the appropriate keys on a touch tone phone, for example.

BRIEF DESCRIPTION OF THE DRAWINGS

The accompanying drawings, which are incorporated herein and form a part of the specification, illustrate preferred embodiments of the present invention, and together with the description, serve to explain the principles of the invention. In the drawings:

FIG. 4 is a schematic representation of the display interface;

FIG. 5 is another representation of the agent position arrangement according to another alternative embodiment of the present invention;

FIG. 6 is still another representation of the agent position arrangement according to still another alternative embodiment of the present invention;

FIG. 26 is a schematic representation of the text change reformatting function for producing a reformatted target screen display of data from a source screen display according to this invention;

FIG. 27 is a schematic representation of the block move function of the reformatting application of this invention; and FIG. 28 is a schematic representation of the add text function of the reformatting application of this invention.

DETAILED DESCRIPTION OF THE PREFERRED EMBODIMENTS

Figure 1:
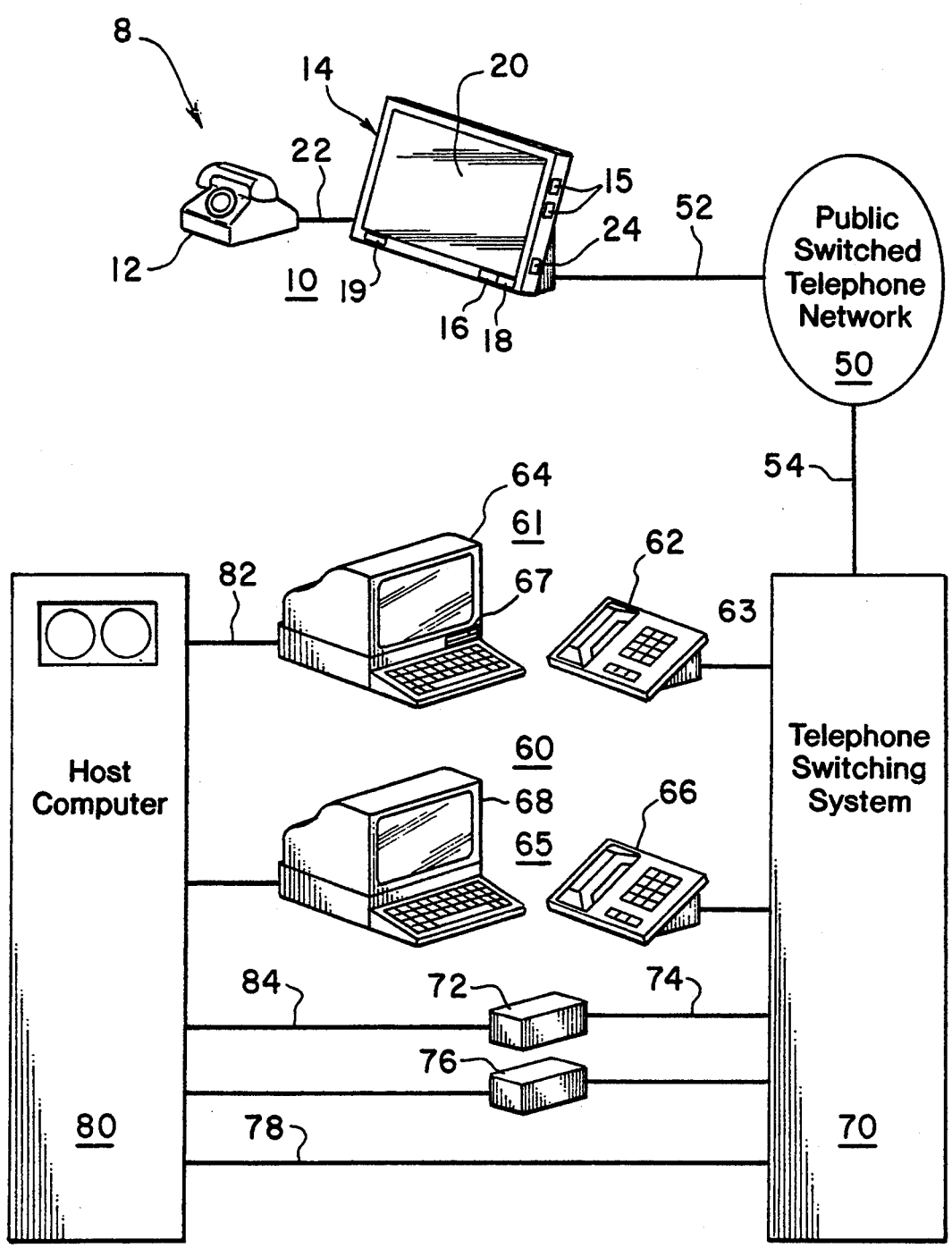
FIG. 1 is a representation of the first preferred embodiment of the telephone display system of the present invention showing both the subscriber position and agent position.

The telecommunication display system 8 of the present invention, as shown in FIG. 1, enhances traditional telephone voice communication with a user's or a subscriber's display terminal 14 positioned at a subscriber or receiver location 10, which display terminal 14 is capable of receiving text, graphics, pictures, and other visual information during the course of voice communications. One application of the present invention is to the telemarketing or telephone sales industry, and it is this application which is depicted in FIG. 1 with telemarketing center 60. The use of this telemarketing application in this specification is for the purpose of facilitating the description of the principles and components of this invention and is not for the purpose of limitation, since other applications are possible, as will be discussed below.

A typical telemarketing center 60 might have one or more telemarketing agent positions, depicted generally in FIG. 1 as agent positions 61 and 65. Because of these multiple agent positions 61, 65, telemarketing center 60 may also contain telephone switching system 70 in the form of a PBX, central office switch, or other network switch.

When a telephone call from a remote location, such as a subscriber position 10, is received by center 60, switching system 70 directs the call to one of the agent positions, such as, for example position 61. Such a telephone call may typically be predominated by voice communication using plain old telephones 12 and 62, respectively. However, at desired times during the conversation, a telemarketing agent (not shown) at position 61 can momentarily interrupt the telephone conversation and transmit data or messages over standard telephone trunk 54 and line 52 to a display terminal 14 at the subscriber's location 10 for viewing by the subscriber (not shown) and possible discussion. The standard telephone trunk 54 and line 52, along with the public telephone system 50 and standard telephones 12 and 62, are typical of the standard, state of the art analog telephone systems that are provided by public utility companies to businesses and homes and are commonly referred to as "plain old telephone system" or "POTS."

The display operation according to this invention is self-contained and controlled totally by the telemarketing agent at position 61, requiring nothing more from the subscriber at location 10 than the possession of the display terminal 14 and passive viewing of the data displayed. Terminal 14 is fed by a standard telephone line 52, which is usually analog, from a Public Switched Telephone Network 50, in other words, a plain old telephone system or POTS, as described above.

Display terminal 14 is essentially "dumb" in that it does not require active input from the subscriber or receiver, but is controlled almost entirely and remotely by the telemarketing agent at position 61. The telemarketing agent has a conventional telephone device 62, which may support analog or some other telephone protocol, as determined by switching system 70. Telephone 62 is connected by telephone line 63 to switching system 70. The agent at location 61 can have a data terminal 64, connected by data interface 82 to a host computer 80. Host computer 80 might not be necessary in some applications, if data terminal 64 is, for example, a personal computer or similar equipment. Data interface 82 can be whatever is appropriate to match existing protocol between host computer 80 and data terminal 64, such as, for example RS-232 or 3270 protocol. Also associated with agent position 61, as shown in FIG. 1, but not necessarily in proximity of telephone 62 or data terminal 64, is a modem 72, which is connected between host computer 80 and the switching system 70 by data interface 84 and telephone line 74. In this embodiment, the host computer 80 has stored therein one or more data bases or other data, some of which the subscriber or receiver might wish to see. Such display data is down loaded to the subscriber from the host computer 80 along a different line, i.e. line 74, to switching system 70, and then to the telephone trunk 54 upon which voice communication travels. However, the agent at position 61 still controls the transmission of this display data from position 61, primarily by appropriate input to data terminal 64.

Similar to agent position 61, agent position 65 can include a conventional telephone device 66, which also may be analog or other protocol, a data terminal or personal computer 68, and a modem 76. As indicated above, there might, and will typically, be several other telemarketing agent positions in addition to positions 61 and 65, using the same host computer 80 and switching system 70. However, such other agent positions need not be shown for the purpose of describing this invention and, for simplicity, are not shown.

In operation, a telecommunication linkage is established and conducted primarily by a voice connection between subscriber telephone 12 and telemarketing agent telephone 62 in a conventional manner, such as by either the subscriber or the agent dialing the other's telephone number. For example, this communication can be initiated by the subscriber (not shown) at location 10 making a call to the telemarketing center 60. This call is routed at the subscriber's position 10 from telephone 12 along telephone line 22 through display 14 and then out along telephone line 52 to the public telephone switching network 50. More information concerning the workings of display 14 and the internal pathway for this calling signal will be described below.

This call is then routed by the Public Switched Telephone Network 50 to the telemarketing center 60 in a conventional manner, where it is received at switching system 70. Switching system 70 may be any common system available on the market, such as those currently available from AT&T ™, Northern Telecom ™, or Rockwell ™. Software internal to switching system 70 locates and directs the call to a free agent, such as, for example, agent position 61. As soon as this incoming call is received at switching system 70, a three-way conference call arrangement is established between: (1) the incoming call from subscriber at location 10 along line 52, network 50, and trunk 54; (2) agent telephone 62 along line 63; and (3) associated modem 72 along line 74. The three-way conference call arrangement ensures there will be sufficient connections available within switching system 70 when the agent desires to transmit display data. The assurance of available connections provided by this three-way conference is especially important for large telemarketing centers containing numerous agents at numerous agent positions.

During the course of the voice communication, the telemarketing agent at agent position 61 can be formulating or deciding on the display to eventually be transmitted to subscriber location 10, with or without verbal input, requests, or suggestions by the subscriber. Such display data may already exist in whole or in part, or in random order in the data terminal or personal computer 64 or host computer 80. Alternatively, all or parts of these displays may be generated dynamically from data bases or may be entered directly from the keyboard, floppy disk 67 (shown on personal computer 64 in FIG. 1), hard disk, or other input means at data terminal or personal computer 64. At an appropriate time during the telemarketing communication, the agent at location 60 can activate a data transmission command from data terminal 64, which is detected by host computer 80. Computer 80 in turn notifies software internal to switching system 70, via control line 78, to send out an appropriate signal along trunk 54, through Public Switching Network 50, and along telephone line 52, eventually arriving at a signal-activated display terminal 14 at the subscriber location 10. This appropriate signal causes display 14 to switch from a voice communication linkage with telephone 12 to a data communication linkage with display screen 20, as will be explained more fully below.

Once the voice communication linkage has been temporally suspended and the data communication linkage has been fully established from data terminal 64 through host computer 80 to subscriber display 14, the transmission of the display data is initiated. Host computer 80 then sends out the digital encoding of the desired display by way of line 84 to modem 72.

Modem 72 may be a standard or special modem that is capable of modulation and demodulation of binary digital information into audio tone signals suitable for transmission over standard analog telephone lines. This modulated digital signal is transmitted to switching system 70 by line 74, where it is sent out to display terminal 14 immediately following the appropriate display activating signal sequence. The remainder of this data transmission connection is through trunk 54, public telephone switching network 50, and telephone line 52 to display terminal 14.

This display data transmission may be accomplished in standard ASCII code, especially if it only comprises written material, to keep data transmission time to a minimum, as opposed to the pixel-by-pixel transmission that is common with facsimile devices, video cameras, and other display data. This ASCII code is mentioned for the sake of example and not for limitation as the display transmission may be in any other standard digital software code or protocol as well. A typical display transmission will take in the range of about eight seconds when transmitted at a baud rate of 2400 bits per second, as will be discussed more fully below.

Following transmission of the display data, the voice communication is immediately re-established automatically between telephones 12 and 62. Display of data on screen 20 is retained by display terminal 14 in a fixed manner, even after re-establishment of voice communication, thereby facilitating verbal discussion of the data, as well as allowing the subscriber or receiver of the data sufficient time to assimilate and study it to his or her satisfaction. The apparatus and process for automatic re-establishment of voice communication according to this invention will be described in greater detail below.

As an example, if the telemarketing agent is an airline ticket sales person or travel agent, he or she can put together a proposed travel itinerary during the course of, and in response to, the voice communication portion of the telecommunication transaction. Such travel itinerary may be generated, For example, utilizing information contained locally at data terminal 64 itself, or it may be created from information contained in a larger data base within host computer 80, with active inputs and data selections by the agent on the keyboard or other input device of the data terminal 64, but without requiring any active computer inputs or interfacing by the subscriber. Then at the appropriate time, when the travel agent wants to show the subscriber (traveler/ticket purchaser) this purposed travel itinerary, he or she can input an appropriate code or signal to data terminal 64 and thereby initiate transmission of the itinerary data for viewing on the subscriber terminal 14.

Additional examples of the types of data that may be displayed during a telemarketing communication include description of goods or services and their prices for comparison purposes or visual confirmation of an order. As an alternative, the agent switching system 70 can even be set up to transmit a display upon initial receipt of a call, while the call is being queued for a free agent or while the subscriber is on hold awaiting a free agent. Examples of such initial displays may be the telemarketing center's logo or trademark, or other displays such as a recipe of the week for phone orders placed to grocery stores.

Terminal 14 should be fitted with a minimum of user controls, which in this case may be an on/off switch 24, a screen scroll button 16, a screen clear button 18, and picture controls 15. Picture controls 15 may include a contrast control and, in the case of a CRT screen, a brightness control. The other control 19 is optional print button, and will be discussed below. In keeping with the principles of this invention, which teach an essentially "dumb" or passive terminal, terminal 14 contains no keyboard, hard disk, floppy disk, or other means of data entry locally at subscriber location 10, although it could also be equipped with those kinds of active input, data processing, and data storage devices, if desired.

Figure 2:
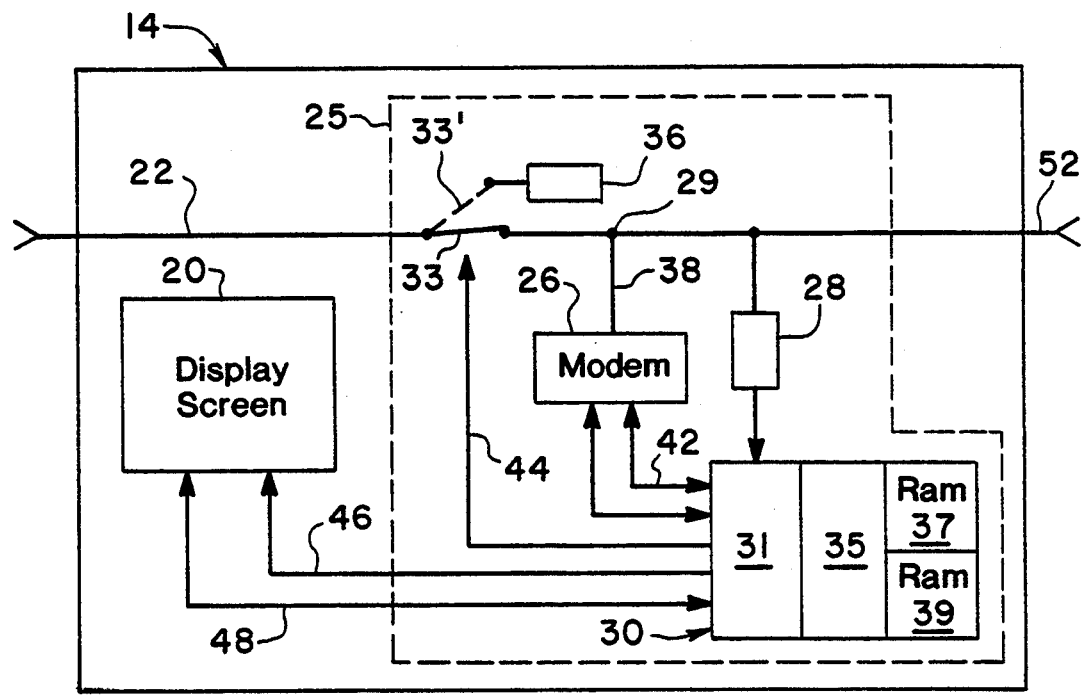
FIG. 2 is a schematic representation of the subscriber position display terminal.

Display terminal 14 contains internally a voice/data selector 25, as shown in FIG. 2. Voice/data selector 25 establishes a three-way communication linkage at junction or node 29 between incoming line 52, telephone line 22 attached to telephone 12, and data line 38. Data line 38 is further fed through modem 26 and data line 32 to microprocessor 30. This three-way linkage is similar to the three-way conference call linkage established at the agent switching system 70.

Voice/data selector 25 includes a switch 33, which is set to a normally closed position, as shown in FIG. 2, to allow voice communication, whereby the incoming line 52 is connected to telephone position 12 (FIG. 1) by way of line 22. A line monitor 28 scans the incoming signals on line 52. When the monitor 28 detects the particular signaling sequence indicating the beginning of a data transmission, as was discussed above, it alerts microprocessor 30 in such a manner that microprocessor 30 in turn actuates switch 33 via path 44 to the open position, thereby momentarily disconnecting voice communication from or to subscriber telephone set 12 (FIG. 1). Microprocessor 30 also activates modem 26 or causes it to go offhook via control line 42, as well as alters display screen 20 via control path 46 to the reception of display data via line 32. This activation establishes a data communication linkage such that modulated digital data enters along incoming line 52 and is transmitted by line 38 to newly activated modem 26 for demodulation. The digital data is then transferred from modem 26 via line 32 and through micro-processor 30 to display screen 20 where it is displayed.

Microprocessor 30 and/or modem 26 handles all the necessary electronic handshaking and protocol typical of data transmissions. On subsequent transmissions of displays during the course of a single voice communication event, less handshaking or possibly even no handshaking may be required.

Microprocessor 30 may include a peripheral interface 31, which interfaces with most of the remaining components of display terminal 14, and a microcontroller 35, which acts as the central processing unit of display terminal 14. Microprocessor 30 may additionally include permanent memory storage capability ROM 39, which may contain operating instructions or even fixed displays internal to terminal 14. Additionally, temporary memory storage capability RAM 37 may be included in the general block microprocessor 30.

As described briefly above, actuation of switch 33 to its alternate state 33' also disconnects the telephone receiver 12 from the incoming line 52 during transmission of digital data. When this momentary disconnect occurs, telephone line 22 is alternately connected to tone source 36 during data transmission. Tone source 36, which is in an always on, ready state, as will be further described below, generates a pleasing tone that is heard over the telephone device 12 in place of the incoming modulated digital data. The pleasing tone of tone source 36 informs the subscriber or receiver on telephone 12 that he or she has not been totally disconnected from the agent position 61. A simulated voice message could also be used in place of, or in addition to, tone source 36 to inform the subscriber what is happening, and requesting that he or she stay on the line until the data transmission is complete. A default written message to the same effect could also be displayed on the screen momentarily while the data transmission is occurring. Such a default message may be stored internal to display terminal 14 itself, in either RAM 37 or ROM 39, and actively delivered to display screen 20 along data path 48 by microprocessor 35.

The end of a data string, therefore, the end of a data transmission, is detected by modem 26 or microprocessor 30. The end of a data transmission may be identified by microprocessor 30 by an end of file (EOF) marker or by modem 26 due to the end of the signal carrier. Once the end of data is detected. microprocessor 30 then generates a signal to re-activate switch 33 to its normally closed mode to re-establish the voice communication linkage to telephone set 12 while disconnecting the tone generator 36. Modem 26 then shuts down or goes onhook after the appropriate delay, thereby disconnecting the data communication linkage to display screen 20.

As already mentioned, display terminal 14 may be provided with the memory and software capabilities, such as RAM 37 or ROM 39, for storing several screens of display data. Variable memory space, such as provided by RAM 37, could be used to dynamically store several display screens, either during the course of a single telephone conversation or for later reference after the completion of a given telephone conversation. In the case of fixed special message display screens, which for example may read "Please Stand By For Receipt of Display Information," the display information is stored in permanent memory, ROM 39. Such additional stored screens could then be transmitted back and forth between display screen 20 and microprocessor 30 by data path 48.

In the absence of power, such as during a black-out, switch 33 remains in its normally closed position allowing telephone device 12 to operate in normal voice transmission mode despite the inhibited display functions. Similarly, if power is lost during a data transmission, switch 33 returns to its normally closed position to allow continued normal operation of telephone 12.

Figure 3:
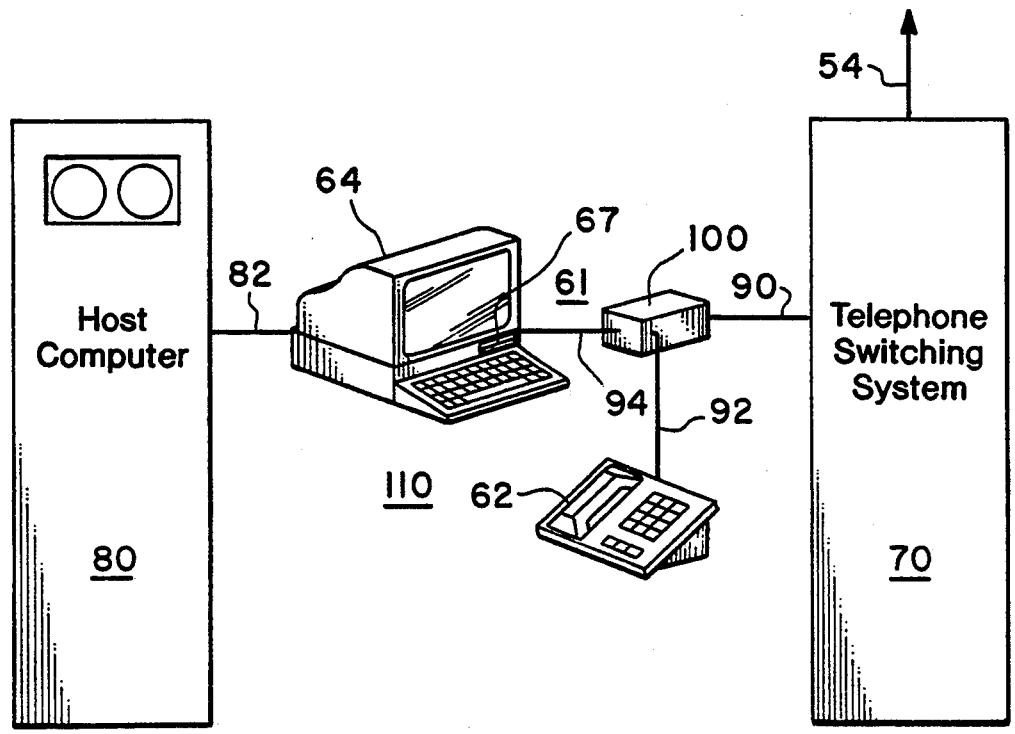
FIG. 3 is a representation of the agent position arrangement of an alternative embodiment of the present invention.

An alternative embodiment of agent center 110 is shown in FIG. 3. Only one agent position 61 is shown in center 110 for simplicity. However, this embodiment is equally adaptable to multiple agent positions. Center 110 contains the same agent switching system 70 and host computer 80 as the previous center 60. Similarly, agent position 61 also contains the same data terminal 64, connected to host computer 80 by data interface 82, and the same conventional telephone 62. The preferred feature of agent center 110 is a display interface 100. The three-way conference call connection among the switching system 70, the telephone 62, and the data terminal 64 is set up in display interface 100 instead of in switching system 70. Therefore, only one telephone line 90 need be directed to each agent position from switching system 70. This arrangement allows easy installation of the telecommunication display system of this invention without modification of existing switching equipment 70 and software. This three-way connection is between incoming line 90, telephone line 92 also connected to telephone 62, and data interface 94 connected to data terminal 64, and it occurs at node 129, as seen in FIG. 4.

Display interface 100, shown in FIG. 4, is very similar to the organization and structure of display terminal 14, except that it has a port 121 instead of a display screen 20. Port 121 may be an RS-232 serial port or other appropriate control interface. Display interface 100 does have a microprocessor 130, an internal modulator/demodulator or modem 126, tone or signal generator 136, and a line monitor 128. Line monitor 128 may be a standard touch tone receiver chip such as, for example, a Teltone ™ M-957-01, if the intended data transmission identification signal is a touch tone signal. Line Monitor 128 allows display interface 100 to function as in a similar fashion to line monitor 28 in voice/data selector 25 by alerting microprocessor 130 in the event of the possible reception of display data from a peer with a similar capability of transmitting display data. Microprocessor 130 may contain a peripheral interface 131 and microcontroller 135, and it can also contain temporary memory storage space in RAM 137 and permanent memory storage space in ROM 139, in the same fashion as those discussed above with reference to microprocessor 30. In this way, display interface 100 allows operation both for an agent and a subscriber equipped with a personal computer, such as terminal 64 in peer communication. Display interface 100 may even be in the form of a card installed internal to personal computer 64, in which case telephone lines 90 and 92 would be reconnected directly by jacks (not shown) to the back of personal computer 64.

In operation of the equipment at the agent center or position 110, when an agent at location 61 desires to transmit some graphics or other display data, he or she enters the appropriate command on the data terminal 64. Data terminal 64 in turn notifies microprocessor 130 in display interface 100 via interface 94, port 121, and control line 148 to begin to set up a data transmission. Microprocessor 130 activates modem 126 by taking it offhook via line 142, and flips switch 133 by way of line 144 to its alternate position 133'. A standard digital sequence indicating the beginning of a data transmission may be generated by internal modem 126. However, if for security reasons it becomes necessary to have a specialized digital sequence or inband signal, such a special sequence or signal can be generated by modem 126 or other circuitry within display interface 100. Such a signaling sequence would inhibit unauthorized access to a subscriber position display terminal 14. As before, no changes would be required to the serving switch 70 or to the public telephone switching network 50 with such a signal.

Once the initial data alerting string actuates modem 126, the digital data can be down loaded from the data terminal or personal computer 64 through port 121 and data 132 to internal modem 126 for modulation. Once modulated, this display data can be sent down line 138 and out line 90 to the subscriber location 10, where it is received, processed, and displayed as described above.

Actuating switch 133 to its alternate position 133' breaks the voice communication linkage between telephone lines 90 and 92 temporarily by connecting telephone 62 to tone generator 136 by way of line 92. This configuration prevents the transmission of the digital data from being heard on telephone receiver 62. Signal generator 136 can send out a pleasing tone or other audible message indicating data transmission is under way.

After the transmission of digital data, personal computer 64 sends an end of data transmission signal by way of interface 94 through port 121 and control path 148 to microprocessor 130. Microprocessor 130 then re-activates switch 133 to re-establish the voice communication connection between lines 90 and 92. A message is also sent from microprocessor 130 by way of path 146 through port 121 and interface 94 informing data terminal or personal computer 64 of the completed transmission. Subsequent to data transmission, modem 126 goes onhook after an appropriate delay, which for the sake of example and not intended as a limitation, could be one second.

As with the previous subscriber position modem 26, modem 126 at the agent's end can be any standard off the shelf modem or comparable device. For the sake of illustration and not intended as a limitation, modem 126 may be, for example, any stock 2400 Baud Hayes TM modem. As described above, modem 126 can be set to go onhook after an appropriate delay of one second. This onhook delay time can usually be adjusted with typical off the shelf modems, such that this feature is disabled and the modem never goes onhook, or up to about 25 seconds. As described above, a one second delay seems appropriate with the present invention. One second is long enough to ensure the end of data, while not creating an unnecessarily long delay.

Display interface 100, similar to display terminal 14, also allows the maintenance of voice communication if power is lost by switch 133 remaining in the normal closed position between telephone lines 92 and 90. This operation occurs in a similar fashion to the procedure described above with reference to terminal 14.

Another alternative embodiment agent center 120, which can also include one or more agent positions 61, is shown in FIG. 5. Center 120, with its represented agent position 61, can be substantially the same as center 110 of FIG. 3, except that port 121 is connected directly to host computer 80 by interface 124 rather than to personal computer 64. As before the displays to be transmitted may either be called up from existing and stored displays or generated dynamically via data terminal 64. In either case, in this embodiment 120, the display is sent directly from or routed through host computer 80.

In a further alternative embodiment 130, one or more telemarketing agents can be replaced by a recorded voice information system 140, as shown in FIG. 6. Voice information system 140 may be an audiotex system, such as, for example, Conversant TM manufactured by AT&T TM. Further, voice information system 140 may be a voice mail service, such as one of the several model available from Octel TM. Recorded voice system 140 may further be an integral part of the switching system 70, or it can be external to switching system 70, such as the system 140 shown in FIG. 6. Recorded voice system 140 may also be connected to host computer 80 (not shown in FIG. 6).

Embodiment 130 uses the same display interface 100 as described in the previous embodiments with telephone line 152 connected to recorded voice system 140. In embodiment 130 data transmission path 154 connects a display generator 156 to port 121 of display interface 100. Display generator 156 may be a separate processing system or combined with system 140. Display generator 156 is in communication with audiotex/recorded voice system 140 by linkage 158.

During operation of embodiment 130, the primary mode will again be voice communication. Typically, a subscriber or user will call into the audiotex or voice mail system 140, thereby establishing this voice communication. Once established, voice system 140 initiates preprogramed messages, or audio instructions, which may be in the form of a menu of options, such as, for example "press one to listen to your messages, press two to record a new greeting, etc." At the appropriate point, the voice information system 140 will notify the display generator 156 to begin the conversion to data communication, as described above.

A standard voice mail service 140 can record voice mail messages. These recorded voice mail messages may additionally be displayed by phone or extension number, date, and time called on the display terminal 14. When the subscriber dials into service 140 to retrieve his or her messages, voice mail service 140 may transmit a display listing the message. The subscriber can then select in a menu access fashion those voice mail messages he or she wishes to hear and in which order he or she wishes to listen to them. Accordingly, random access could be afforded to a voice mail system instead of the traditional, painstaking, serial access method.

Figure 7:
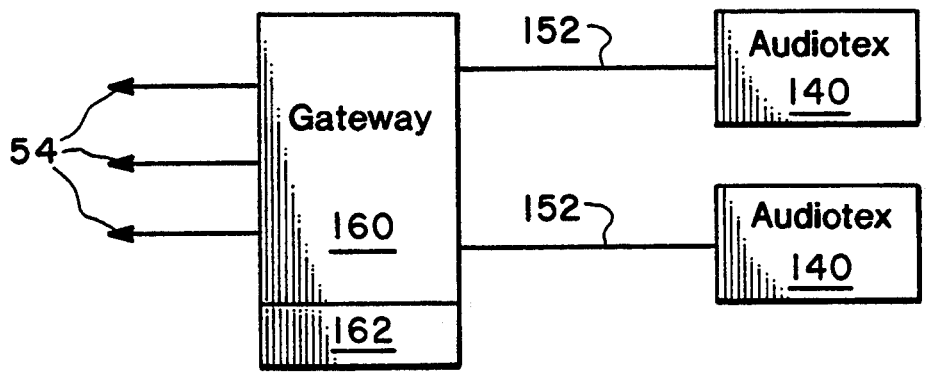
FIG. 7 is yet another representation of the agent position arrangement according to yet another alternative embodiment of the present invention.

Several such audiotex or voice mail systems 140 may be connected through a common gateway 160, as shown in FIG. 7. Such gateways are common in the industry. A caller, possibly with a display calls into gateway 160 via trunks 54. Based upon number dialed or other selection criteria such as a caller inputted digits, gateway 160 then directs the call to any one of several systems 140. Gateway 160 could generate its own displays or displays in association with systems 140 by use of an internal display generator 162. This allows both oral communication with a caller via systems 140 as well as transmission of display data via display generator 162, without requiring systems 140 to have their own display generator associated with them.

Referring again to FIG. 1, display screen 20 portion of display terminal 14, as shown and described above, is a flat screen, liquid crystal display (LCD). However, display terminal could also be a LCD or an electrochromic, eletroluminescent, plasma discharge, or vacuum fluorescent display, as well as a more conventional cathode ray tube (CRT) or any other visual display device, including a portable, pocket-sized screen, as would be obvious to persons skilled in this art after becoming familiar with the functions and components of this invention.

Now referring back to FIG. 2 to offer a few more details, the nature of line monitor 28 may vary depending upon the nature of the signaling sequence used to indicate the beginning of data transmission. Such a signaling sequence may be DTMF or MF tones. If the signaling sequence is a DTMF signal, as might be sent by a DTMF sender chip, which may be internal to modem 126 (FIG. 4), then line monitor 28 could be a DTMF receiver chip, which for the sake of example and not for limitation could be a Teltone TM M-957-01.

Also for the sake of example and not intended as a limitation, micropressor 30, including peripheral interface 31 and microcontroller 35, may be any one of several micropressor integrated chips such as an Intel TM 8051 microprocessor. Further, the RAM 37 may be any standard integrated chip, but again for the sake of example, may be comprised of multiple Harris TM 65162 chips, which are 2000×8 bit static RAM chips.

The display terminal 14 features of the present invention may be further augmented by the addition of a printer (not shown), which could generate hard copies of the displays received by terminal 14. The printer could be queued by any optional print screen button 19, as shown in FIG. 1. The printer could be any standard computer printer such as an EPSON TM LQ-1000. More elaborate printers such as the Apple Laser Writer Plus TM or the Hewlett Packard Laser Jet Series III TM would be equally applicable, however, they may have more capabilities than would be required with the present invention.

A screen 20 with 80 columns by 25 rows should be enough to display a complete travel itinerary or a complete audiotex menu. At 2400 baud, a complete display of 2000 characters or about 300 words, can be transmitted in approximately eight seconds, which compares to only about 10–20 words, spoken intelligibly, in the same time interval.

The on/off switch 24 on display terminal 14 need only be activated once upon initial set-up and installation of display terminal 14. Terminal 14 may remain in a constant on, ready posture from that point on. This constant on, always ready posture includes power being constantly supplied to tone generator 36 and microprocessor 30, as well as the other components of display terminal 14, with reference to FIG. 2, such that they are in an always on and ready state. Accordingly, on/off switch 24 need not be in a predominate position, such as the front or side as depicted in FIG. 1. Rather on/off switch 24 may be located in the back, behind a panel, or in some other concealed place.

Display terminal 14 can retain a given display on screen 20 after voice communication is re-established during a given telecommunication event, and it can also retain the display after the termination of such event when both parties have disconnected. A given display may therefore be retained and displayed indefinitely, until clear button 18 is pressed or another display is received.

Accordingly, the display terminal 14 may also serve as a visual answering machine or notification device.

Figure 8:
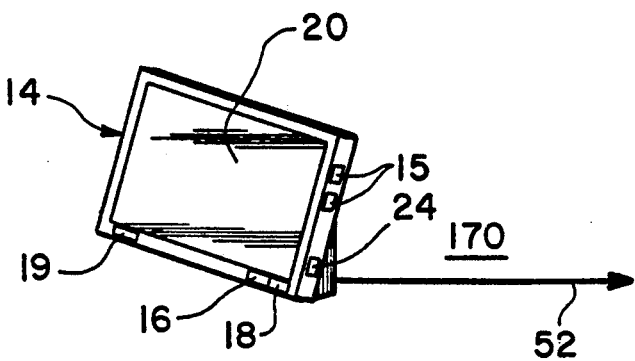
FIG. 8 is another representation of the subscriber position according to another alternative embodiment of the present invention.

For example, terminal 14 can be set-up to act as a visual answering machine or in the alternative, terminal 14 may act as a notification device independent of a traditional telephone device 12, as seen in embodiment 170 in FIG. 8. Then when a call is received, terminal 14 will answer the call under appropriate conditions, either answering machine mode in embodiment 10 from FIG. 1, or as a notification device in embodiment 170 from FIG. 8, and is ready to display a given transmitted display. Such display would then be retained until the subscriber arrives back at location 10 for viewing. If the display terminal 14 has provisions for storing multiple screens of information, such as RAM 37 as described above, it can answer and record multiple screens of information for later viewing.

Figure 9:
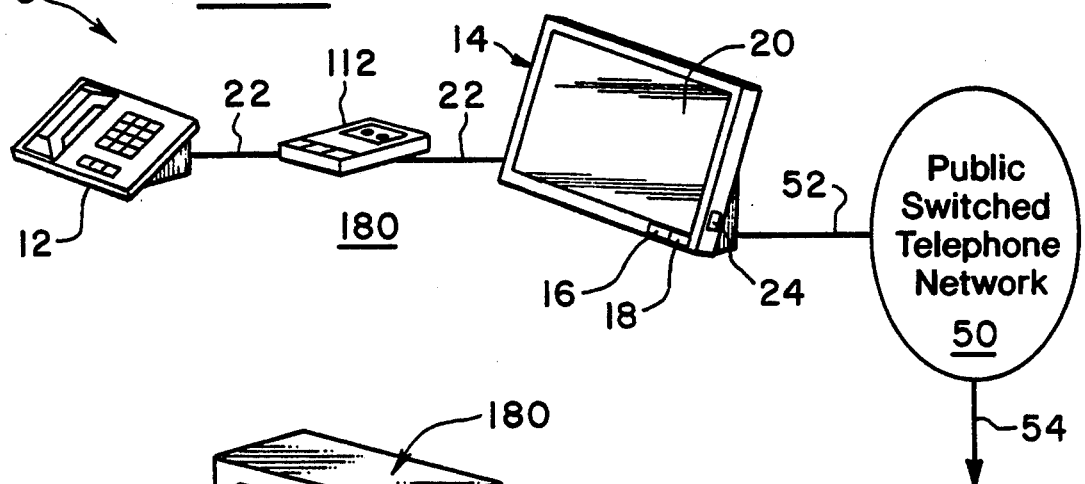
FIG. 9 is still another representation of the subscriber position according to still another embodiment of the present invention.

Additionally, a typical voice recording answering machine 112, found in embodiment 180 and shown in FIG. 9, can also be connected to telephone line 22. Answering machine 112 may be either internal or external to telephone device 12. In this embodiment 180, answering machine 112 could be set to auto-answer for the purpose of recording messages or screening calls as is well known in the industry. Upon receipt of a call, the three-way communication linkage could be established at node 29 in display terminal 14 (FIG. 2). If the caller desires to leave a voice message, switch 33 could remain in the normally closed position connecting incoming line 52 to answering machine 12 via telephone line 22, and a voice message could be left on the voice answering machine. However, if the caller wished to leave a display message in addition to, or instead of, a voice message, the appropriate signaling sequence could be transmitted down line 52. This signaling would still be detected by line monitor 28, as described above, activating microprocessor 30 and altering display screen 20 for the reception of the given display. During the transmission of the display, a pleasing tone generated by tone source 36 would be left as a message on answering machine 112. As described above, the caller can be re-connected to answering machine 112 following transmission of display data.

Figure 10:
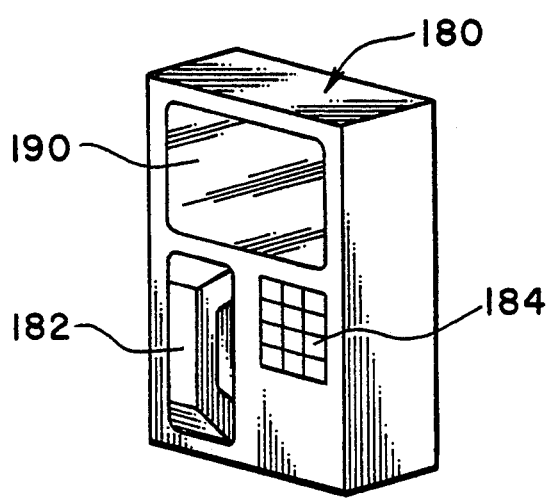
FIG. 10 is yet another representation of the subscriber position according to yet another alternative embodiment of the present invention.

It is also possible for a telephone device and a display screen, such as the above-described telephone 12 and display terminal 14, to be combined into a single unit 182, as shown in FIG. 10. The structure and operation of such a single unit 180, with its display screen 190, handset 182, and digital or analog dialing mechanism 184 is similar to that described above with reference to separate devices 12 and 14.

A single unit device 180 may be in the form of a private phone for personal or business use or in the form of a public telephone such as a courtesy or pay phone in hotel lobbies, airports, or restaurants for example. Such a public display phone 180 could be used by travelers to make airline reservations with a visual confirmation, by business people to exchange financial information, or by the general public to access the above-described audiotex or voice services 140, (shown in FIGS. 6 and 7).

Examples of consumer to business applications in addition to those given above include banking transactions, emergency hotline services, and entertainment. Examples of business to business applications include employee informational services, ordering of parts, daily news letters, and general information dissemination from headquarters to branch offices. Additionally, for business applications the above-described subscriber/agent relationship, could be replaced by an employee/employer relationship where each employee could play the role of agent in a peer-to-peer arrangement. A few possible examples of uses for specialized audiences include university course registration, hotel billing, notification services, and medical emergencies. Consequently, the applications for this invention are not limited to commercial telemarketing operations, but can be any situation where an active holder or creator of data or information needs to transmit the data for visual display to a passive viewer or receiver over the same telephone line on which they are having bidirectional verbal communications. The present invention can further serve as a service for the hearing impaired or any user who must operate in a noisy environment.

Although the present invention cannot directly access CompuServe TM and other videotex services or such public access databases, such as Prodigy TM, Lexis TM, and Dialog TM, it can access a knowledgable agent as described above who may have direct access to such services. Such public consumer databases require special equipment, knowledge, and frequently special training, which inhibits such use by persons who are not inclined to encounter those public consumer databases on those terms. The present invention may allow a consumer or subscriber access to these or similar databases with the benefit of a knowledgeable, helpful human agent at a telemarketing or other remote location to perform the complex user steps for the consumer to access such data.

Additional features are possible if the telephone switching system 70 can identify whether or not a caller is set up with a display terminal 14. Upon receipt of an incoming call, switching system 70 could respond with a pre-recorded greeting, followed by a prompt to the caller, such as, for example "press one if you have a display terminal." Such a determination of whether a caller has a display terminal 14 by switching system 70 may also be accomplished by way of an automatic query of line being transmitted. In which case, if the caller had a display terminal 14, microprocessor could receive and recognize the automatic query and respond with an appropriate signal indicating the presence of a display terminal 14. All of which could be accomplished without any effort or input on the part of the caller.

If the subscriber can receive displays, the above described three-way conference calling arrangement can be established and an initial display, including a trademark, advertising, or other useful information can be sent, while the call is queued to an agent station 61. Further, the agent at position 61 can be informed, possibly by an appropriate message from switching system 70 or from host computer 80 for display on terminal 64, as to whether or not a caller has a display terminal 14, such as subscriber location 10.

The party identication features could also be accomplished if some of the various above described elements support ISDN. The current public telephone network is analog. ISDN, which stands for "integrated services digital network", if adopted would establish a new digital network. ISDN, as currently proposed, would include two carrier bands or channels and one channel for signaling information or data, refered to as 2B+D. It is this D or data channel which carries signaling information, addressing, party identification, and other hand shaking or functional protocols which could be used as a substitute for the above determination of whether a caller has a display terminal 14. Thus, if trunk 54 supports ISDN, it would be possible for a switching system 70 to establish whether or not a particular user or subscriber has a display terminal 14, without requiring the above described verbal or keyed touch tone sequence such as, "Press one if you have a display terminal."

Further, if the trunk 54, the public switching network 50, and the subscriber's telephone line 52, all support ISDN, then the data communication link can be established on a separate channel, and the voice communication link need not be interrupted during display transmission. It should be understood that the present invention neither requires nor depends on the adoption of ISDN. One of the many advantages of the present invention, as described above, is its efficient operation with the existing analog public telephone network, even though the present invention, as well as the entire telephone system and its peripherals, might be enhanced by ISDN.

The features of the present invention may additionally be enhanced by a personal computer at or near subscriber location 10. The subscriber could then exercise some control over display terminal 14 himself or herself. He or she could send display data to other subscribers. This arrangement would allow the possibility of peer to peer transmission, or employee to employer as described above, although it departs somewhat from the passive terminal for unsophisticated users, which is an advantage of the first preferred embodiment described above.

As discussed above, one of the principal objects of this invention is the ability to transmit data for visual display accurately, but also with minimal interruption of the voice communications. At the same time, another principal object of this invention is to allow one party or agent to initiate and control transmission of the visual display data to a passive receiver or subscriber. The receiver or subscriber needs virtually no computer training at all, other than to turn on the power for the display terminal 14 and possibly to use a button or knob 16 to scroll the display. Perhaps also nearly as important, the agent also needs very little computer literacy and a minimum of training to operate the system 100 from the agent's position 60. A principal feature of this invention is the protocol that meets those objectives.

Figure 11:
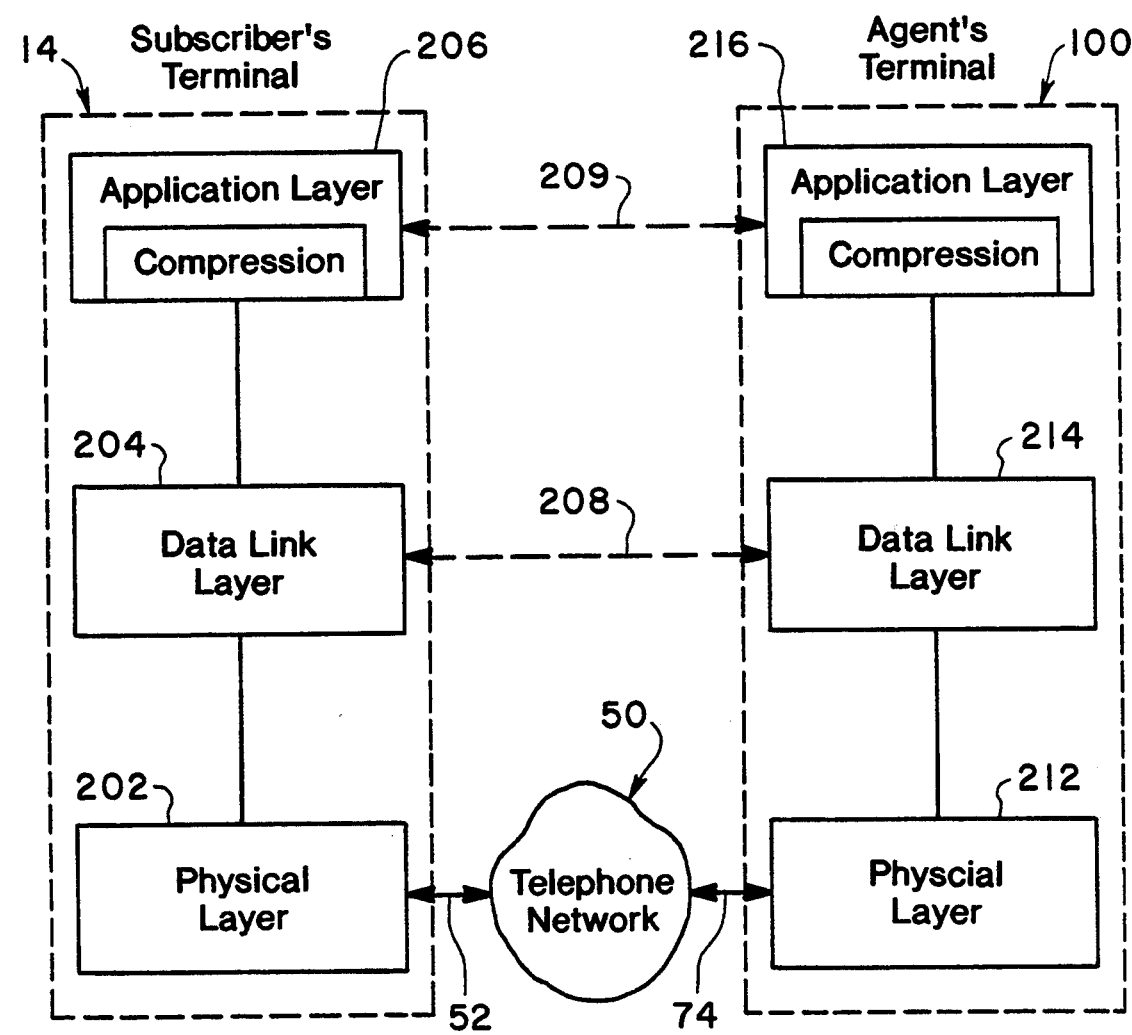
FIG. 11 is a block diagram of the protocol layers of the telecommunications system of this invention.

The protocol according to this invention is layered, as illustrated in FIG. 11, including a physical layer 202, data link layer 204, and application layer 206 at the subscriber terminal 14 and similarly described physical layer 212, data link layer 214, and application layer 216 at the agent terminal 100. The physical layers 202 and 212 of the respective terminals 14 and 100 include the computer and switching hardware that convert digital control and data information into connections and analyze signals that are required to interface with, and to transport information across the telephone network 50, as will be described in more detail below. Therefore, the physical layer 202 at the subscriber terminal 14 and the physical layer 212 at the agent terminal 100 are connected by telephone lines 52 and 74, or by suitable wireless substitutes, to each other through the telephone network 50, as described above.

This physical connection 202 can include well-known data access arrangement (DAA) and signal conditioning circuits (not shown in FIG. 11). It also includes directional coupler, high pass filter (HPF), and limiter, which will be described in more detail below. A special purpose modem integrated circuit (modem IC), such as a R96DFX MONOFAX (trademark) manufactured by Rockwell International Corporation, is included and used in the physical layer 202 for modulation, demodulation, tone generation, and tone detection, but part of it is also used in the data link layer 204 to provide HDLC (High Level Data Link Control) processing. Switching arrangements in the physical layer 202 allow a microcontroller (not shown in FIG. 11) to configure the circuit into either the voice mode for normal voice communication or the data mode for reception of data for visual display, as will be described in more detail below.

The data link layer 204 and application layer 206 of the subscriber terminal 14 may be perceived for purposes of this description as being in direct communication with their respective peer data link layer 214 and application layer 216 of agent terminal 100, as indicated by phantom line arrows 208 and 209, but they actually communicate through the adjacent lower layers and through the telephone network 50.

The data link layers 204 and 206 according to this invention comprises essentially a modified HDLC (High-level Data Link Control) protocol that provides pocketing for outgoing data, error detection using CRC and error correction for retransmission for ensuring accuracy of the data transmission, control of line turnaround for reception and transmission of signals, and reassembly of incoming pockets into application level messages. The data link layers 204, 214 implement implicit link establishments at the physical layers 202 and 212, implements selection of data transmission speed according to certain criteria to optimize overall transmission time, and other functions as will be described below.

The application layers 206 and 216 provide the sources for the data to be transmitted and the destination for data received by the lower layers. The method of formatting messages from the application layer is provided according to this invention to allow the data link layers 204, 214 to determine when application responses, thus link turnaround, are required. Those data compression functions are also considered part of the application layer 206, and partial screen updating is implemented in the application layer. Finally, the link tear down control according to this invention is implemented in the application layers 206, 216, including deciding whether no response, one response, or open-ended interchanges are allowed following the current application transmission before the data link is torn down. The term "response" as used here means a response from the peer application layer, 206 or 216, not the normal acknowledgements that the data layers 204 and 214 exchange to insure data integrity.

Figure 12:
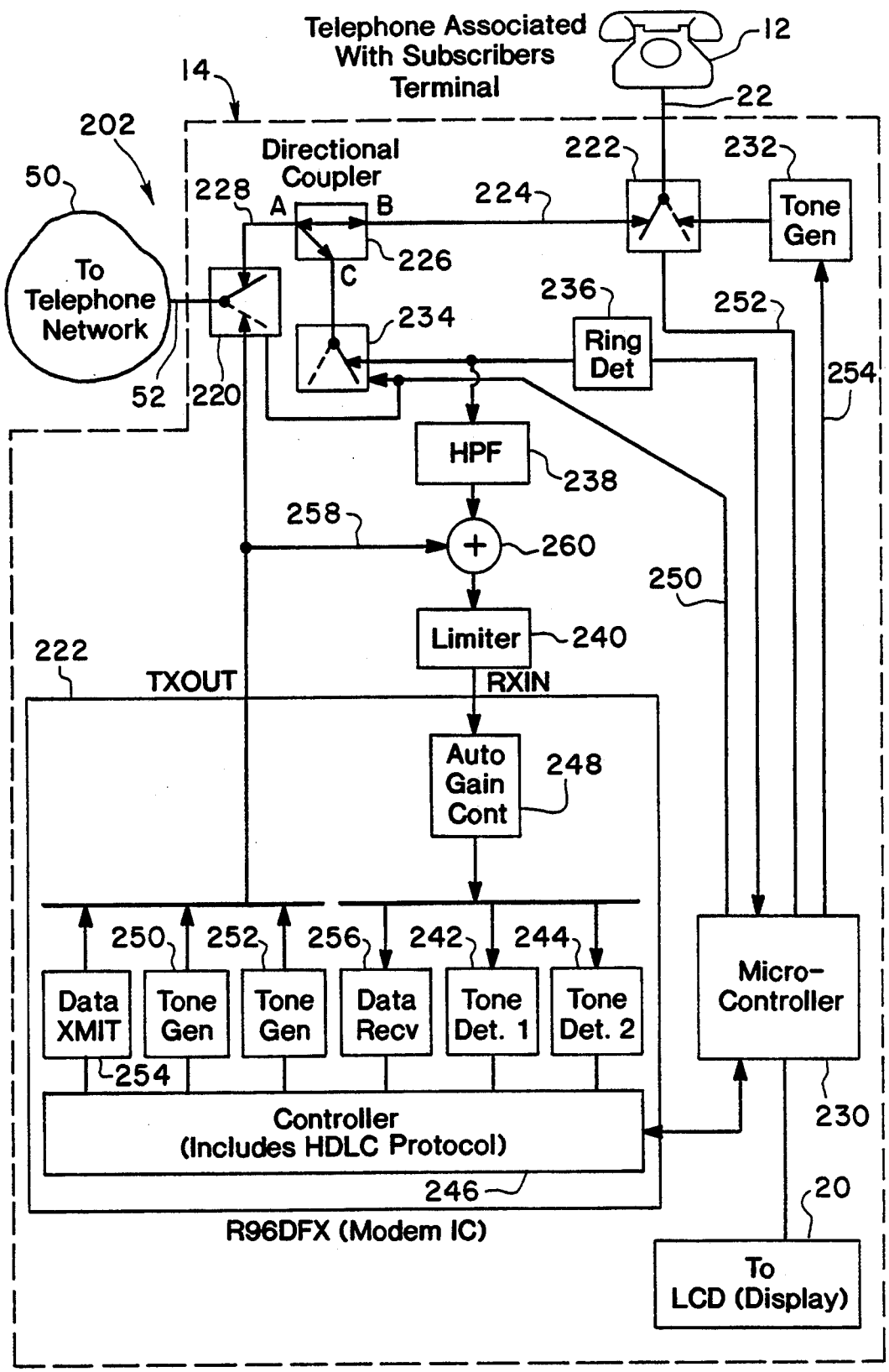
FIG. 12 is a simplified schematic of the principal components and functions of the user's terminal.

Referring now to FIG. 12, the physical level 202 of the subscriber terminal 14, includes a telephone line 52 from the telephone network 50, which telephone line 52 is connected to a first relay switch 220. This first relay switch 220 is for connecting and disconnecting the subscriber telephone 12 and the modem IC 222 to and from the telephone line 52 in response to control signals from the microprocessor or microcontroller 230. The microcontroller 230 preferably comprises a microprocessor integrated circuit and associated memory and peripheral circuitry. For example, it can be a 80C32 device manufactured by Intel Corporation of 3065 Bowers Ave., Santa Clara, Calif. 95051. When the relay switch 220 is switched to its alternate broken-line position, signals are rerouted via connection 258 and summing device 260 to the RXIN contact of the modem IC 222.

The subscriber's telephone 12 is also connected by line 22, a second relay switch 222, internal connection 224, directional coupler 226, and internal connection 228 to the first relay switch 220. The second relay switch 222 also operates in response to a control signal from the microcontroller 230 to alternately connect and disconnect the telephone network 50 via directional coupler 226 and connection 228 and to connect and disconnect the tone generator/local power source 232 to and from the subscriber's telephone 12. A third relay switch 234 is provided to connect and disconnect a ring detector 236 and the microcontroller 230 from the internal telephone connections 224, 228 and directional coupler 226.

The system is normally defaulted to the voice mode, where all the relay switches 220, 222, and 234 are in the solid-line positions shown in FIG. 12 and as described above. Therefore, when the subscriber wants to call out, he or she can do so in a normal or conventional manner by dialing the desired number and ringing out. The directional coupler 226 is fixed such that signals are transmitted bidirectionally between its contacts A and B, thus between the subscriber's telephone 12 and an outside telephone (not shown, in FIG. 12, but possibly including the agent's telephone 62 in FIG. 1). On the other hand, the directional coupler 226 allows only incoming signals on contact A to be transmitted to contact C, where the ring detector 236, microcontroller 230, high pass filter (HPF), 238, limiter, 240, and detector portions of modem IC 222, are connected to the directional coupler 226. Signals from the subscriber's telephone 12 on contact B cannot reach the contact C in directional coupler 226, so that signals from the subscriber's telephone 12 cannot reach the detectors 242, 244 in the modem IC 222. The directionality of the directional coupler 226 as described above is not perfect, but it greatly enhances reliability of initial tone detection.

Essentially, therefore, the agent's terminal or display interface 100 is connected by telephone line 74 to the telephone network 50, as described above and as also shown in FIG. 13. The agent's telephone 62 is connected to the terminal 100 by a local telephone line 63, and it can be selectively connected and disconnected to the telephone network 50 by relay switches 320 and 322, which are controlled by signals from the microcontroller 330. It also includes high pass filter 338 and limiter 340 for noise suppression, and a special purpose modem IC 322, which can be a R96DFX MONOFAX (trademark) device manufactured by Rockwell International Corporation of 4311 Jamboree Road, Newport Beach, Calif. 92658.

When the agent decides to send data for a visual display to the subscriber's terminal 14, he or she designates on his or her display terminal 64 (FIG. 3), the visual data to be sent, which is usually derived in an application level 216 (FIG. 11) from a data base in a host computer 80 FIG. 3 and initiates a send signal at the agent's display terminal 64 (FIG. 3). The agent initiates the send signal to the microcontroller 330 (FIG. 13) via host computer and data interface 80, usually by pushing a designated key on his or her keyboard or by clicking on a designated spot in a "Windows" application at his terminal 64, as will be described in more detail below; however, data transmission can also be initiated automatically by computer 80 or terminal 64, or by display generator 156 in embodiment 130 (FIG. 6), as described above. The physical layer 212 at the agent's terminal 100 then implements an implicit link establishment between the agent's terminal 100 and the subscriber's terminal 14 via the telephone network 50 so that the visual data from host computer 80 can be transmitted by the agents' terminal 100 and received by the subscriber's terminal 14. Please note that for the purposes of this description, the words "visual data" provides a convenient term for reference to the data usually, but not necessarily, from host computer 80 or agent's terminal 64, that is stored, transmitted, and received for the purpose of displaying in a visually perceptible format, such as on the subscriber's screen or LCD display 20, although the data obviously cannot be seen in its magnetic format for storage or in its electric format for transmission. Therefore, visual data means the data that is intended for visual display, as opposed to the signals or electronic transmissions for voice communications via the telephones 12 and 64. Also, the term "voice mode" refers to the configurations of the physical and data link layers of the respective terminals 14, 100 for voice communications between the agent and the subscriber, while "data mode" refers to the configurations of those elements for transmission and reception of visual data.

Figure 13:
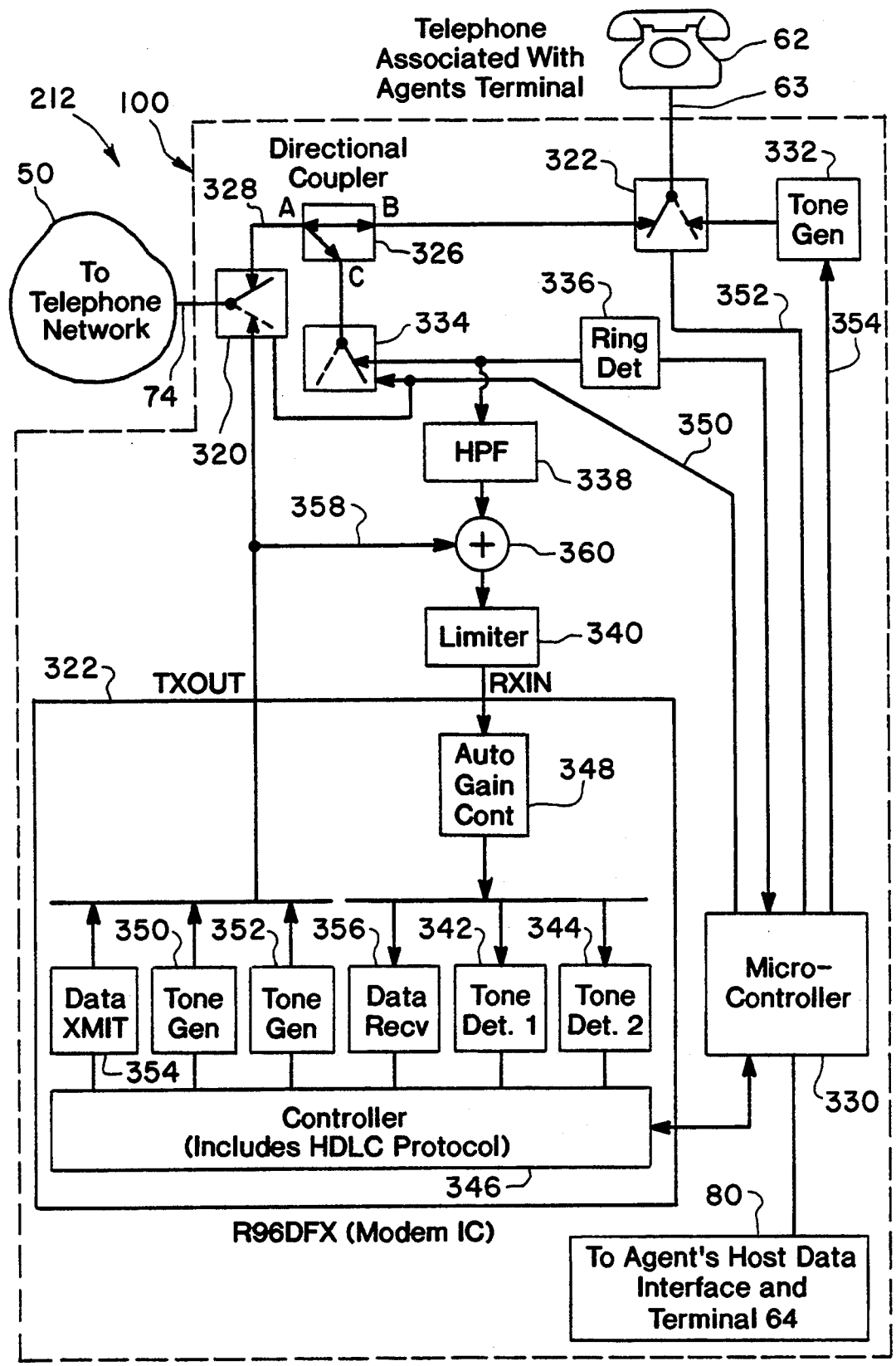
FIG. 13 is a simplified schematic of the principal components of the agent's terminal.

Upon receipt of the "send" signal from the agent's keyboard or terminal 64 (FIG. 3), which is designated generally in FIG. 13 along with the host data interface 80, by the microcontroller 330, the agent's data link layer 214 (FIG. 11), which is implemented by the physical layer 212 (FIGS. 11 and 13), initiates a signal to be sent from the physical layer 212 of the agent's terminal 100 (FIGS. 3, 11, and 13). Therefore, the microcontroller 330 in the agent's terminal functions both at the data link layer 214 and at the physical layer 212 in implementing this implicit link establishment function.

To implicity establish the implicit data link, the microcontroller 330 of the agent's terminal 100 in FIG. 13 outputs signals through connections 350, 352 to the relay switches 320, 322, and 334 to change from voice mode to data mode, i.e., to switch to the alternate, broken-line switch positions, thereby disconnecting the agent's telephone 62 from the telephone line 74 and telephone network 50. Simultaneously, the microcontroller 330 also outputs a signal via connection 354 to actuate the local power supply/tone generator 332, if it is not already actuated, to provide an alternate local power supply to the agent's telephone 62 and to provide a pleasing tone or simulated voice message to assure the agent that his or her phone 62 has not gone dead.

Next, the microcontroller 330 configures the modem controller 346 in modem IC 322 to cause the tone generators 350, 352 to generate two simultaneous tones of different frequencies on the TXOUT terminal and send them via the telephone network to the subscriber's terminal 14 (FIG. 12). These two tones can be, for example, 2312.5 Hz and 2912.5 Hz for 200 milliseconds. These two tones will signal the subscriber's terminal 14 (FIGS. 3, 11 and 12) that visual data is coming, so the subscriber's terminal 14 can reconfigure itself to the data mode and implicitly establish the data link, as will be described in more detail below.

The microcontroller 330 then reconfigures modem controller 346 in modem IC 322 to cause the data transmit device 354 to send a number of small flag signals, e.g., six flag signals, at a low rate of about 300 bits per second (bps). A standard HDLC protocol flag, which may be used in this invention, includes six bytes of data where a 01111110 byte is standard in HDLC protocol.

The flags are intended for detection by the subscriber's terminal as an indicator that transmission speed designator signals are coming next, as will be described in more detail below.

Once the flags have been sent, the microcontroller 330 (FIG. 13) reconfigures the modem controller 346 again to cause the one or more of the tone generators 350, 352 to generate tone signals that indicate to the subscriber's terminal 14 (FIG. 12) the bit rate that is selected for the actual visual data transmission once the link is established. For example, a single 1412.5 Hz tone generated by tone generator 352 for 60 milliseconds indicates that the baud rate of the visual data transmission will be the low rate, e.g., about 300 bps. A single 2312.5 Hz tone generated by tone generator 350 for 60 milliseconds may indicate the bit rate will be a medium rate, e.g., about 4,800 bps. Simultaneous 2312.5 Hz and 1412.5 Hz tones for 60 milliseconds can indicate the bit rate will be a high rate, e.g., about 9,600 bps. The selection as to which bit rate to use for visual data transmission is based on a set of criteria that is the most time efficient for the nature of the visual data that is to be sent, as will be described in more detail below. The subscriber's terminal 14 (FIG. 12) uses these signals to get itself configured to receive the visual data at the bit rate that is selected by the agent's microcontroller 330 (FIG. 13), as will also be described in more detail below.

These tone patterns described above are also used each time the link is turned around after it is established initially, although it may be advantageous to increase the durations for the medium rate of about 4,800 bps and the high rate of about 9,600 pbs speeds in order to compensate for the missing initial tones and flags. For example, tone durations of 188 milliseconds may be used for this purpose. The initial tone pair that was generated to notify the subscriber's terminal 14 that visual data is coming and the follow-up flags, as described above, are not regenerated when the link is merely turned around, as opposed to establishing it in the first instance.

After the last tones indicating the data transmission bit rates are transmitted, the agent's microprocessor 330 at the data link layer 214 (FIG. 11) assumes that the data link has been established. Therefore, it reconfigures the modem controller 346 (FIG. 13) to set the data transmit device to the selected bit rate and to transmit the visual data, for example in ASCII code format, or in any other desired standard or nonstandard format, and it proceeds to send or transmit the visual data. This assumption that the link has been established and proceeding immediately to send the visual data saves a substantial amount of time in most ordinary circumstances. If this assumption is wrong, and the data link was not established, for example, due to a momentary interruption in the connection, the data link layer 214 (i.e., the microcontroller 330) will use a "retry" procedure to repeat the above-described sequence one or more times, as will be described in more detail below.

At the subscriber's terminal 14, as best seen in FIG. 12, which is normally in the voice mode before visual data transmission is initiated by the agent, as described above, the pair of different frequency tones indicating the initiation of a voice data transmission is received. These initial tones, it may be recalled from the description above, tell the subscriber's terminal 14 that visual data is coming. That pair of tones, upon reaching contact A of directional coupler 226, via the telephone network 50, are transmitted to contact C, where they are picked up by the modem IC 222 via the high pass filter 238 and limiter 240. The high pass filter 238 passes only high frequency signals, like this pair of tones, to eliminate low frequency noise from the subscriber's telephone 12 that might get through the directional coupler 226, since the directional coupler device is not prefect in passing signals only from the outside source.

The modem IC 222, as illustrated in FIG. 12, has two energy or tone detectors 242, 244, which can be used for detecting the two tone signal generated at the agent's terminal 100 that says visual data is coming. One tone detector 242 is tuned to the frequency of the first of the two tones, e.g. 2312.5 Hz, and the other tone detector 244 is tuned to the frequency of the second of the two tones, e.g., 2912.5 Hz. A modem controller 246 connected to the two tone detectors 242, 244 monitors those tone detectors 242, 244, and when a preset threshold energy is detected from both of them, the controller 246 sends a signal to the microcontroller 230, thereby letting the microcontroller 230 know that visual data is coming on the telephone line 52.

An automatic gain control device 248 is provided in front of the energy or tone detectors 242, 244 to adjust the energy level or amplitude of incoming signals to keep the incoming signal level within limits acceptable to the tone detectors. At the same time, the limiter 240 is positioned in front of the automatic gain control 248 to place a high limit on the amplitude of signals transmitted therethrough so that an extraneous noise burst or spike emanating from the subscriber's telephone 12 or anywhere else in the system that might get through the directional coupler 226 does not cause the automatic gain control to lower the energy level at the same time that the tones are coming from the agent's terminal 100. A speaker phone at the subscriber's location could be particularly problematic, for example, if it is picking up a loud background conversation while the tone signal is being transmitted. Pots and pans clanging in the background or other loud noise sources also have the potential of causing problems, if they occur while the tones are being transmitted. Therefore, using tone frequencies that are high in the voice band (300 Hz to 3300 Hz), such as the 2312.5 Hz and 2912.5 Hz tones described above, in conjunction with the directional coupler 228, high pass filter 238, and limiter 240 helps to provide the robustness according to this invention that is required for the reliable detection of the initial tones for establishing the data transfer link. The high pass filter 238 prevents lower frequency signals from reaching the modem IC 222. Since much of the energy in voice signals is in these lower frequencies, the automatic gain control function 248 in the modem IC 222 is prevented from saturating and thereby inhibiting the detection of the desired tones. The limiter 240 is also important in preventing high amplitude (loud) signals from causing the automatic gain control function 248 in the modem IC 222 to saturate.

Upon receiving the signal from the modem controller 246 that data is coming, as described above, the microprocessor 230 emits control signals via connections 250 and 252 to switch relays 220, 222, and 234 to the data mode, i.e., to the broken-line positions illustrated in FIG. 12, thereby disconnecting the subscriber's telephone 12 from the telephone network 50 and telephone line 52. This disconnection is implemented so the subscriber will not hear the data stream, and noises from the subscriber's telephone 12 will not interfere with the data transmission or reception. At the same time, the microcontroller 230 also sends a signal via connection 254 to the local power supply/tone generator 232, which is now connected by relay switch 222 to the subscriber's telephone 12. In this data mode, the local power supply/tone generator 232 powers the subscriber's telephone and provides a pleasing tone or simulated voice message letting the subscriber know that his or her telephone 12 did not go dead and that data is being transferred.

After the 2-tone energy drops below the preset threshold, the microcontroller 230 reconfigures the HDLC or modem controller 246 to detect flag signals in the data receiver function 246 of modem IC 222, which is also connected through the data (broken line) mode of relay switch 220, connection 258, and summing device 260, thus to the telephone line 52. As described above, the agent's terminal 100 transmits a number of flags immediately after the initial tone pair signal to inform the microcontroller 230 in the subscriber's terminal 100 that signals indicating transmission rate are coming next. As described below, these initial flags are relatively short data streams, so they are usually transmitted initially at a low rate, such as the 300 b.p.s. described above. Therefore, the miscrocontroller 230 is programmed to instruct the modem controller 246 to initially set the data receiver function 256 to the low rate, e.g., 300 b.p.s.

Upon receiving the signal from the controller 246 of modem IC 222 that the flag or flags have arrived, the microcontroller 230 resets or reconfigures the controller 246 to actuate its tone detector functions 242, 244 to detect the tones that comprise the rate signal from the agents's terminal 100, e.g., 1412.5 Hz and 2312.5 Hz, because those are the tone frequencies generated by the agent's terminal 100 to indicate the bit rate selected for the data transmission, as described above. It might be feasible in some circumstances to eliminate this flag notice function and program the microcontroller to look directly for the bit rate indicator tones after the initialization, which could be faster, but it also could compromise robustness in terms of reliability. To compensate, the tones for the 4,800 bps and 9,600 bps speeds should also have a longer duration, such as 188 milliseconds.

The tone or tones indicating the bit rate for the data transmission are then received and detected by the controller 246 of the modem IC 222. The tones detected are then signaled to the microcontroller 230, which interprets them to decipher the bit rate set by the agent's terminal, and the microcontroller 230 in turn instructs the modem controller 246 of modem IC 222 to set its data receive function 256 to the bit rate indicated by the tone signal. If the flags or rate tones are not detected, the microcontroller 230 returns the subscriber's terminal 14 circuit to voice mode, and the agent's terminal 100 will eventually retry to establish the data link, as will be described in more detail below.

The data receive function 256 of the modem IC is the demodulator portion of the modem function. It receives data, including the visual data being transmitted by the agent's terminal 100. The controller 246 of the modem IC 222 checks. good frame/bad frame sequences in the visual data received and, if the frames are good, send the visual data to the microcontroller 230. The microcontroller 230 then gathers the good frames of visual data until it gets a complete set and then sends them to subscriber's LCD display 20 or whatever other compatible display device that is being used. The microcontroller 230 is programmed to recognize when it receives a complete visual data set and whether it is the end or if it is supposed to give a response back to the agent's terminal 100. The controller 246 may also first store the visual data in memory for later retreival along with other received groups of visual data.

When the end of the data transmission has been received, the microcontroller 230 turns the link around once in order to send an acknowledgement to the agent's terminal 100 that all of the frames were received. To do so, the microcontroller 230 instructs the modem controller 246 to set up the data transmit function 254 of the modem IC 222 for the appropriate transmission rate, as described in more detail below, and it sets up the tone generators 250, 252 to send an advance signal ahead of acknowledgement data to let the microcontroller 320 of the agent's terminal 100 know what bit rate will be used. The microprocessor 320 of the agent's terminal 100 uses that rate signal to set up the data receive function 356 of the agent's modem IC 322 at the elected bit rate, similar to that process described above for the subscriber's terminal 14, so it can receive the acknowledgement data and send it to the agent's microcontroller 320. Initial start tones and flags do not have to be sent for this link turn around function for purposes of the acknowledgement.

Once the acknowledgement is sent, the subscriber's terminal 14 turns the link around and waits to receive a disconnect message from the agent's terminal. When the disconnect is received, or when a time limit is reached, the microcontroller 230 tears down the data link by outputting signals to the relay switches 220, 222, and 234 and to the local power source/tone generator 252 to switch them back to the voice mode. The microcontroller 230 then reconfigures the modem controller 246 to activate the tone detector functions 242, 244 of the modem IC 222 to detect data link initiation tones again, and finally it goes into an idle mode waiting for the next data link initiation tones.

At the agent's terminal 100, the acknowledgement data is received by the data receive function 356 of the modem IC 322 via alternate connection 358 and summing device 260. It is demodulated and sent by the controller 346 to the microcontroller 330. The microcontroller 330 notes the receipt of the acknowledgement data, which indicates that it does not have to initiate a retry. The microcontroller 330 turns around the link and sends a disconnect message to the user's terminal 14, then the microcontroller 330 finishes tearing down the data link by outputting signals to the relay switches 320, 322, and 334 and to the local power source/tone generator 332 to return the agent's terminal 100 to the voice mode, i.e., to reconnect the telephone 62 to the telephone network 50.

The microcontroller 330 can also be programmed to send signals to the agent's display interface or terminal 80 to display visual messages, such as "Data Transfer in Progress" during the link establishment and visual data transmit operations and "Data Transfer Complete" during the link tear down process. After the link tear down is complete, the microcontroller 330 goes into an idle mode, waiting for the next "send" signal initiated by the agent from the agent's keyboard or Windows display terminal 80.

Figure 14:
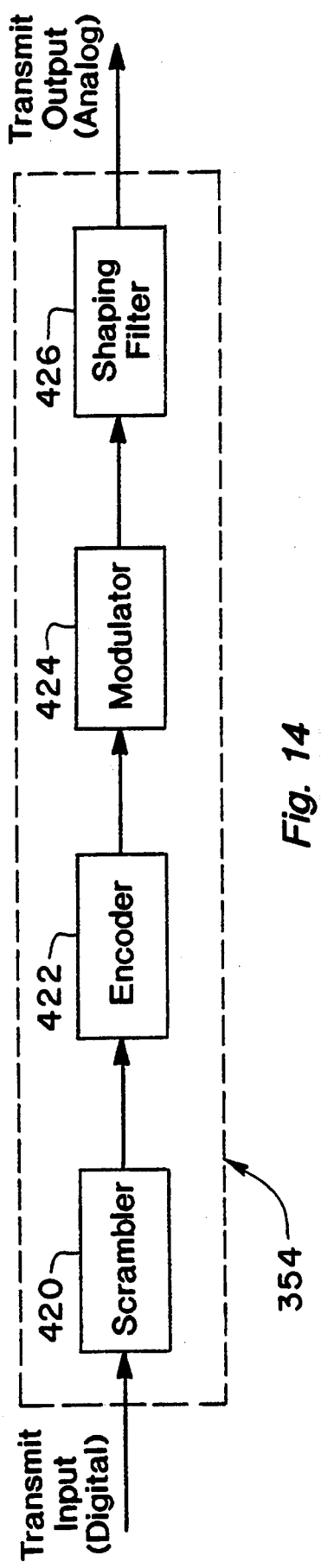
FIG. 14 is a block diagram of the high speed transmitter functions of the modem IC.

The block diagram in FIG. 14 illustrates the high speed (9,600/4,800 bps) transmitter function steps utilized in the modem IC's 222 and 322 of the terminals 14 and 100. The data to be transmitted is digital at the input. It is fed into a scrambler step 420 for evening out the distribution of 1's and 0's, then into an encoder step 422 for breaking up the data into groups of bits suitable for modulation, through a modulator step 424 for conversion from digital to analog form, and then through a shaping fitter 426 for compensating for telephone network transmission characteristics. The result is an analog data signal that is transmitted via the telephone lines to the other terminal.

Figure 15:
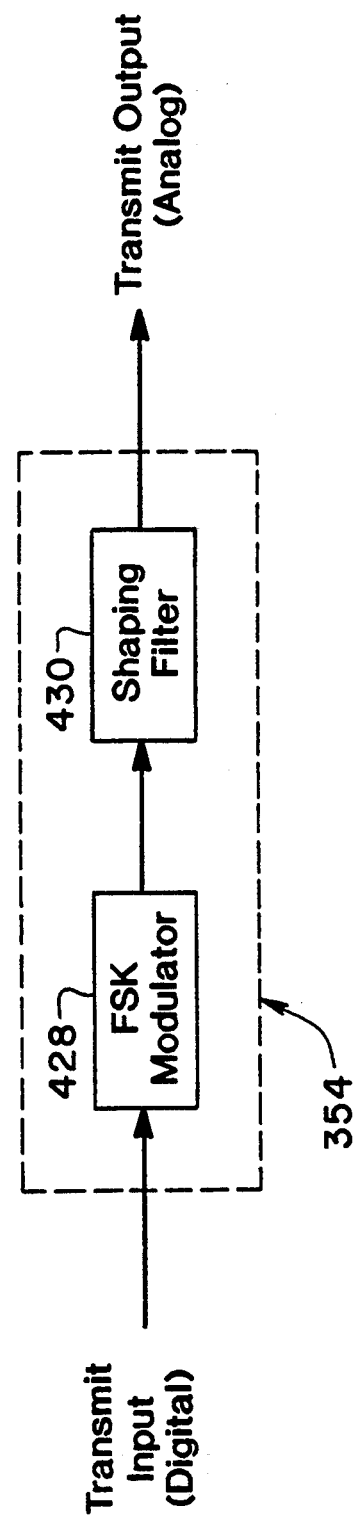
FIG. 15 is a block diagram of the low speed transmitter functions of the modem IC.

By comparison, the low speed (300 bps) transmitter functions 254, 354 of modem IC's 222 and 322 are illustrated in FIG. 15. The digital data goes only through an FSK (frequency shift keying) modulator for conversion from analog to digital form and a shaping fitter 430 for compensating for telephone network transmission characteristics for output in analog form to the telephone lines.

Figure 16:
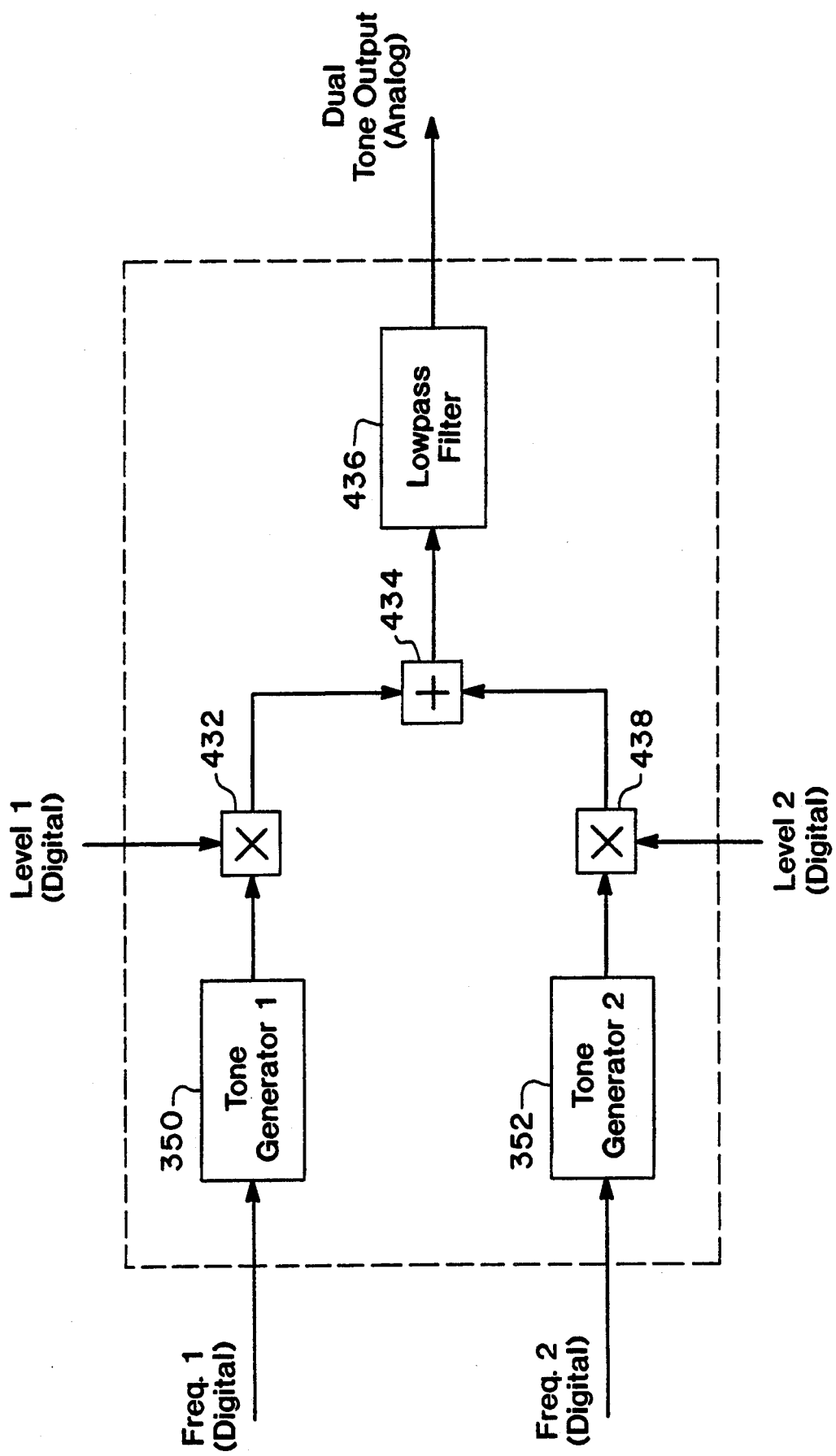
FIG. 16 block diagram of the dual tone transmitter functions of the modem IC.

The dual tone transmitter functions of the modem IC's 222 and 322 are illustrated in FIG. 16. A digital control signal for the value of first tone frequency is fed from the controller 246 or 346 of the modem IC 222 or 322 to the tone generator 350 to generate the first tone at 2312.5 Hz. A level 1 digital signal is input at 432 for controlling the amplitude of the first tone. It is then fed through summing device 434 and through a low pass filter 435 for elimination of undesired frequency components. Likewise a digital control signal for the value of second tone frequency is fed from the controller 246 or 346 to the tone generator 352, which generates the 1412.5 Hz or 2912.5 Hz tone. A level 2 digital signal is applied at 438 for controlling the amplitude of the second tone. The second tone is passed through the summing device 434 and low pass filter 436. The result is a single tone of either frequency or both tones simultaneously, as described above, for either initiating the link establishment procedure or setting the transmission speed.

Figure 17:
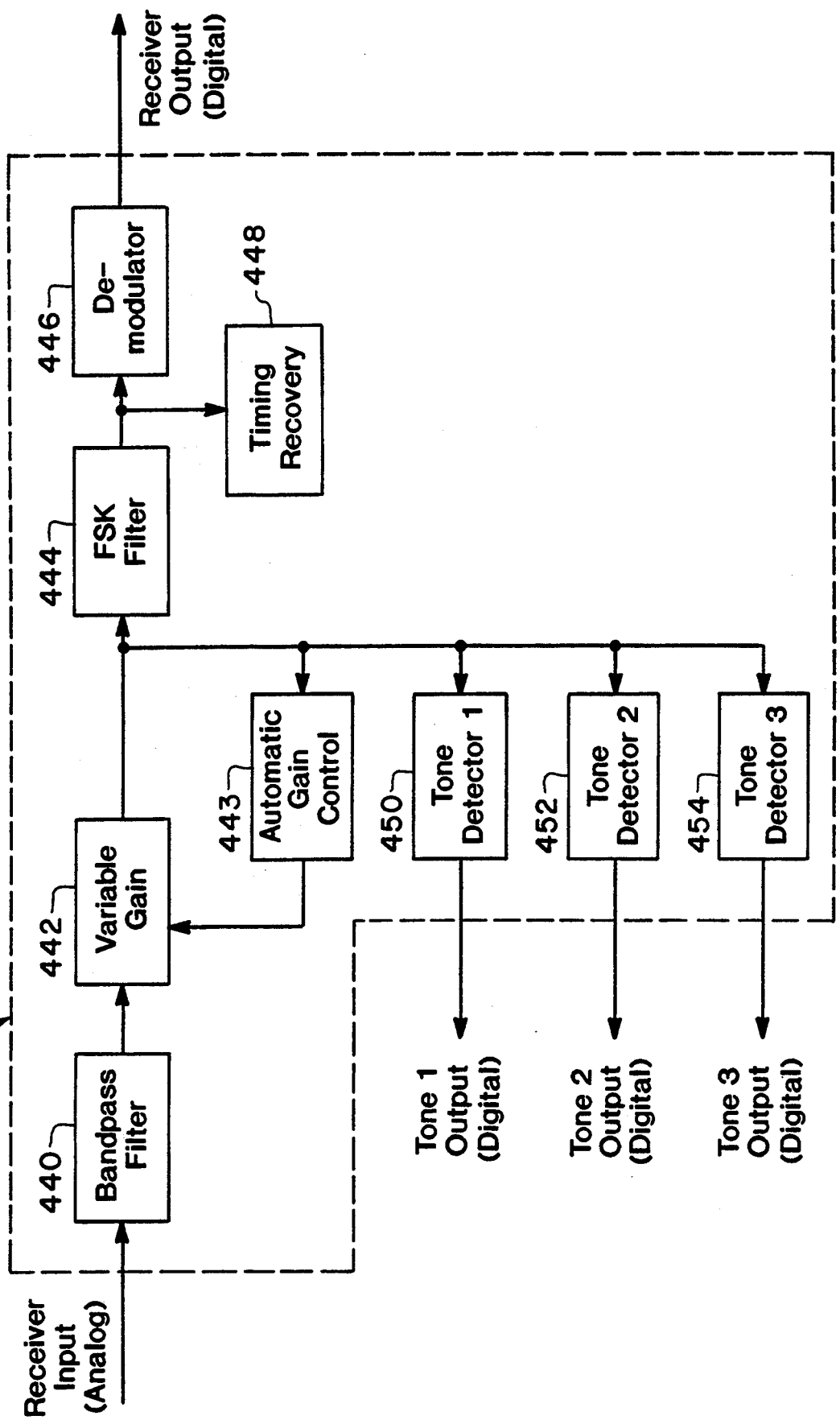
FIG. 17 is a block diagram of the low speed receiver function of the modem IC.

The low speed (300 bps) tone receiver function 242 or 342 of the modem IC's 222 or 322 is shown in FIG. 17. This configuration of modem IC's 222 and 322 is used when receiving 300 pbs data or when detecting tones.

When receiving tones, the received analog signal is passed through bandpass filter 440 to eliminate unwanted frequencies, then to variable gain element 442, which together with automatic gain control 443, implements the automatic gain control 248, 248. The output of the variable gain element 442 feeds into tone detectors 450, 452, and 454, only two of which are used in the present implementation. The tone detectors produce a digital signal which indicates the presence or absence of the tone to which they are tuned.

When receiving 300 bps data the bandpass filter 440, variable gain element 442, and automatic gain control 443 operate as described above. The output of the variable gain element 442 feeds into FSK filter 444 where the data tones are filtered from the signal, then to timing recovery function 448 where the bit positions are identified, and to demodulator 446 where the data is recreated in digital form. The resulting data is sent to the controller of modem IC 222 and 322 for further processing.

Figure 18:
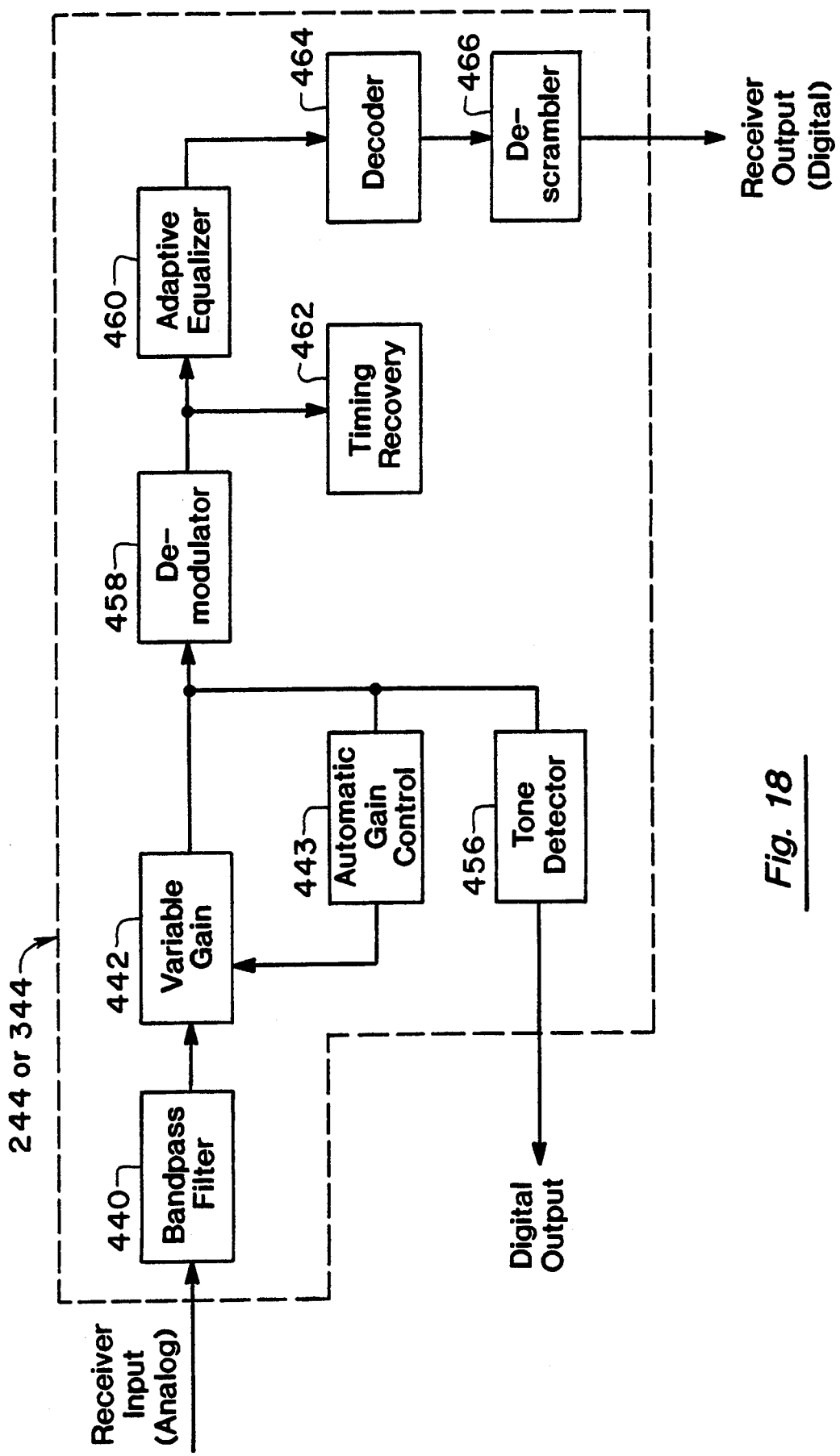
FIG. 18 is a block diagram of the high speed receiver function of the modem IC.

The high speed (9,600/4,800 bps) tone receiver 244 or 344 of modem IC's 222 or 322 is illustrated in FIG. 18. This configuration of modem IC 222 and 322 is used when receiving 9600 bps or 4800 bps data. The received analog signal is passed through bandpass filter 440 to eliminate unwanted frequencies, then to variable gain element 442, which together with automatic gain control 443, implements the automatic gain control 248, 348. The output of the variable gain element 442 feeds into demodulator 458, timing recovery 462, and adaptive equalizer 460 where the signals are reduced to a decodable form, then to decoder 464 where the digital data is recovered, then to descrambler 466 where the originally transmitted data is separated from the scrambling sequence. The resulting data is sent to the controller of modem IC 222 and 322 for further processing.

Figure 19:
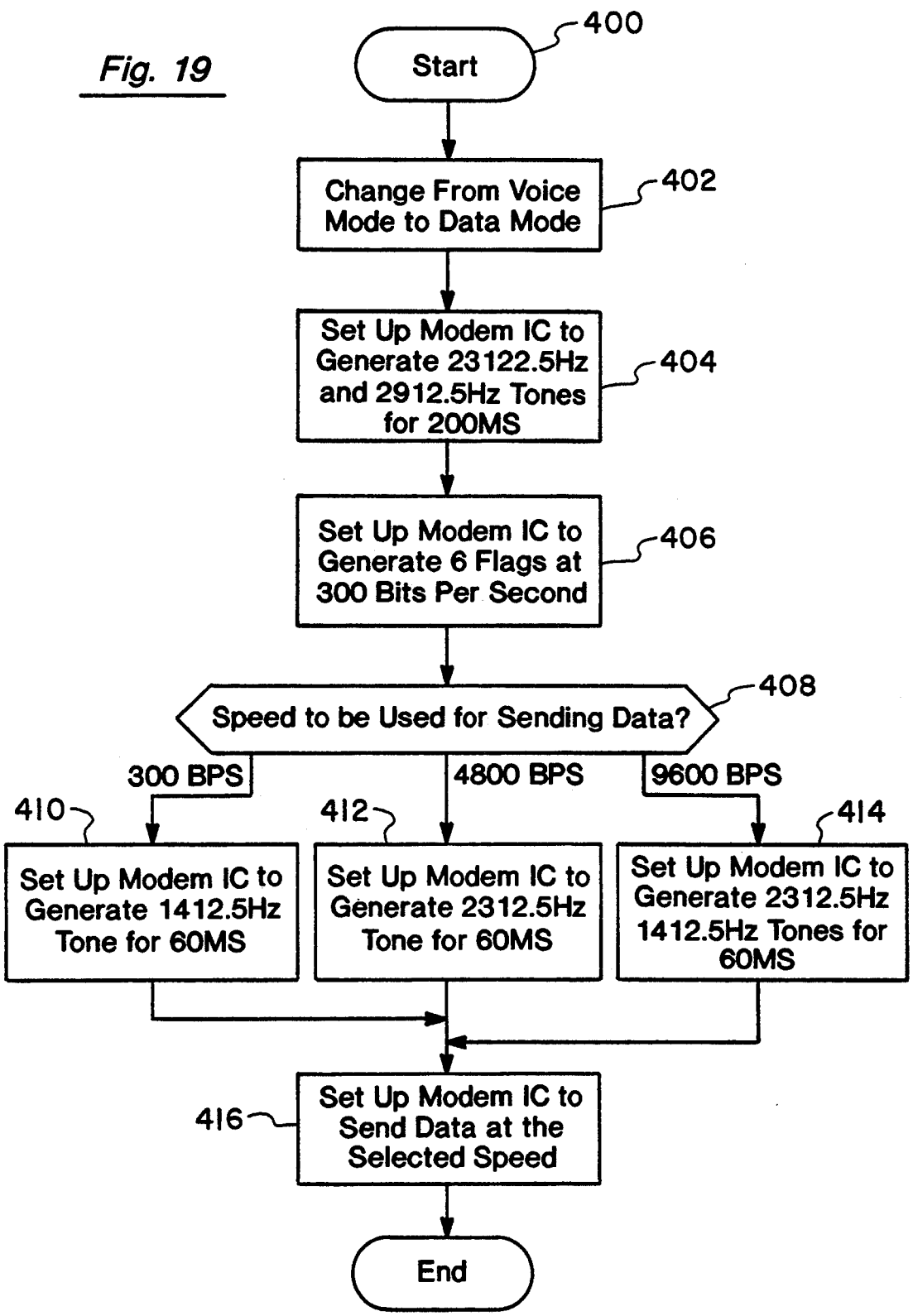
FIG. 19 is a flow chart of the link establishment procedure at the terminal that initiates a data transfer.

On the levels of the data link layer 214 and application layer 216 of the agent's terminal 100 (FIG. 11), the implicit link establishment procedure is best illustrated by the flow chart logic in FIG. 19. The procedure to initiate link establishment begins in the application layer 216 (FIG. 11) at the start step 400 (FIG. 19) when the agent presses a key on the keyboard or clicks a mouse with the cursor on a Windows screen selection, thereby requesting that the visual data selected by the agent be transmitted to the subscriber's terminal. The data link layer 214 responds by instructing the physical layer 212 (FIG. 11) to execute the link establishment procedure described above.

The physical layer 212 changes the agent's terminal 100 from voice mode to data mode at step 402 (FIG. 19), sets up the modem IC 322 (FIG. 13) to generate the 2312.5 Hz and 2912.5 Hz initiate tones at step 404 (FIG. 19), and sets up the modem IC 322 (FIG. 13) to generate the six flags at 300 pbs at step 406 (FIG. 19).

In the next step 408, the data link layer 214 (FIG. 11) selects the transmission speed to be used for sending the visual data to the subscriber's terminal 14. The criteria for transmission speed selection is basically that a short data stream with few characters can be sent more time efficiently by low transmission speeds that do not require as much time to prepare the link for transmission, such as echo canceler switching and the like, as to prepare for higher rate transmissions. For example, any data stream that is less than four characters is preferably transmitted at 300 bps. Any data stream that contains 4 or more characters is preferably transmitted at a transmission rate of 9,600 pbs (or 4,800 bps if that is the current speed.

The implementation of the transmission speed selection according to this invention depends on the fact that the protocol used requires the application layer 216 to terminate each data transmission with one of the following control characters: EXT, ETB, or EOT. If the data link layer 214, specifically the microcontroller 330, received one of these control characters before receiving the predefined number of characters, i.e., 4, it sets up the transmission rate at 300 bps; otherwise, it sets up the transmission rate at 4,800 bps or 9,600 bps. Then, before initiating the data transmission, the microcontroller 330 sets up the modem IC 322 to generate the speed indicator tones at step 410, 412, or 414 for the subscriber's terminal 100, so it can set itself to receive data at the selected speed. Finally, the microcontroller 330 sets up the modem IC 322 at step 416; which ends the implicit link establishment procedure according to this invention. Transmission of the visual data at the selected speed then follows.

Figure 20:
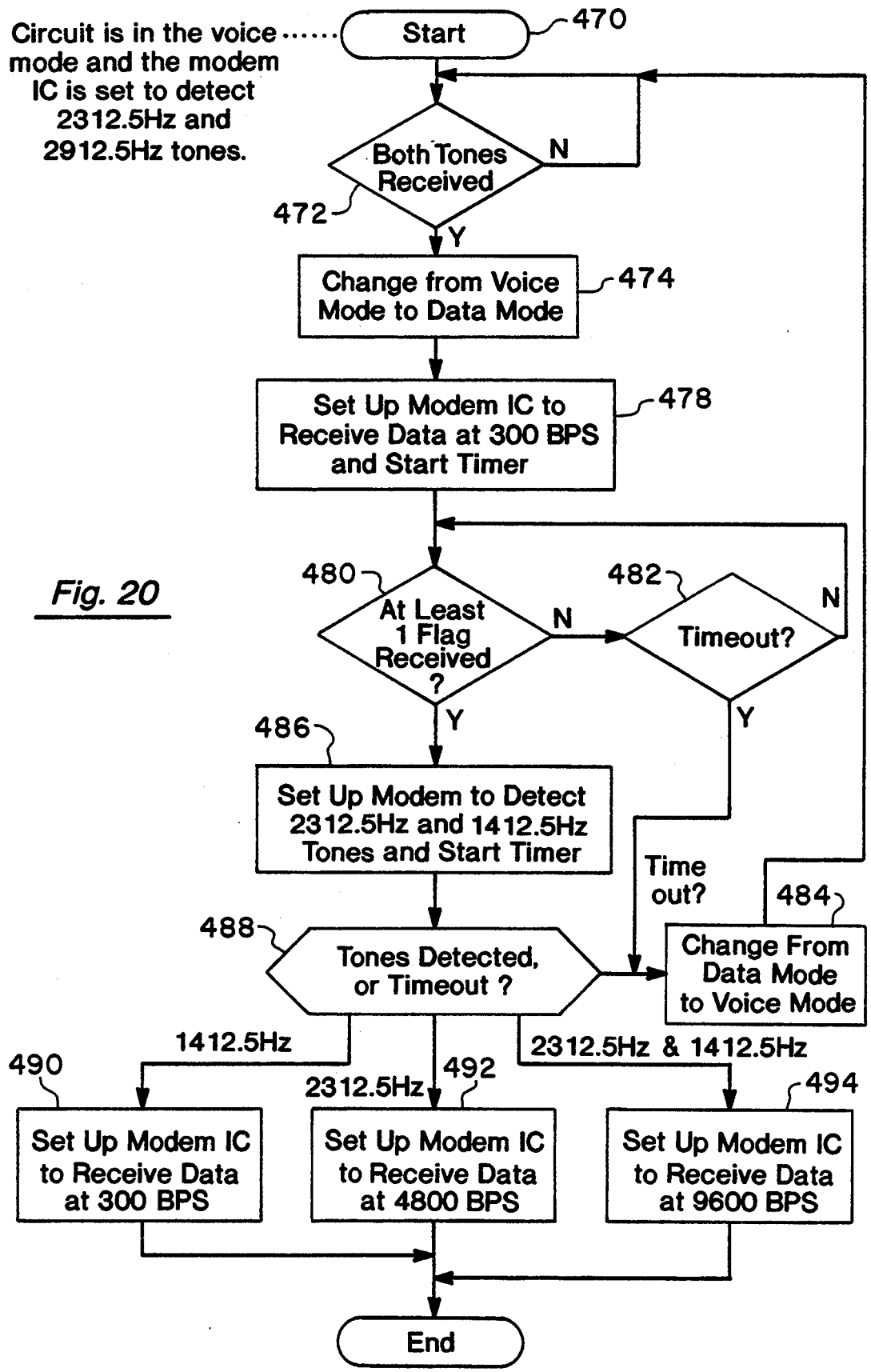
FIG. 20 is a flow diagram of the link establishment procedure at the terminal that responds to the link establishment initiated in FIG. 19.

The implicit link establishment functions of the data receiving terminal is shown in FIG. 20. The visual data receiving terminal is considered to be the subscriber's terminal 14 for purposes of this description, but it could also be descriptive of the agent's terminal 100 under some circumstances. It starts at 470 with the assumption that the circuit of terminal 14 is in the voice mode and the modem IC 222 is set to detect the 2312.5 Hz and 2912.5 Hz initializing tones. The first step 472 is for the microcontroller 230 to determine whether both of the 2312.5 Hz and 2912.5 Hz tones were received by the modem IC 222. If not, the microcontroller 230 stays at idle. If so, the microcontroller 230 switches the terminal 14 to from the voice mode to the data mode, as described above, at step 474.

The microcontroller 230 proceeds to the next step, 478 to set up the modem IC 222 to receive the data at 300 bps and to start a timer. The time is set to provide an outside limit for the microcontroller 230 to see transmission of the flags before it returns the terminal to voice made. Otherwise, a false signal that sounds like the initiating tone could cause a switch to the data mode and leave it locked there waiting for the flags that never come.

The microcontroller 230 then monitors receipt of the six data flags, and at step 480 it determines whether at least one of the flags have been received. If not, step 482 checks to see whether the time has run out. If not, it continues to wait. If so, it proceeds to step 404, where it changes the subscriber terminal back to the voice mode.

On the other hand, if at least two flags are detected at step 480, then the microcontroller 230 sets up the modem IC 222 at step 486 to detect 2312.5 Hz and/or 2912.5 Hz tones generated by agent's terminal 100 to inform the terminal 14 as to what baud rate the following data will be transmitted. It also resets the outside time limit for detecting those tones.

The step 488 is where the microcontroller 230 finds that either the speed setting tones are detected or the time runs out. If the time runs out at step 488 with no speed tones detected, then it proceeds to step 484 where it changes terminal back to the voice mode. On the other hand, if the speed tones are detected at step 488 before the time runs out, then the microcontroller 230 proceeds to set up the modem IC 222 to receive at either 300 bps (step 490), 4,800 bps (step 492), or 9,600 bps (step 494). Specifically, receipt of a single 1412.5 Hz tone causes a 300 bps set-up; a single 2312.5 Hz tone causes a 4,800 bps set-up; and a 1412.5 Hz tone together with a 2312.5 Hz tone causes a 9,600 bps set-up. Once the modem IC 222 is set to receive the visual data at the selected speed, the link is established.

Figure 21:
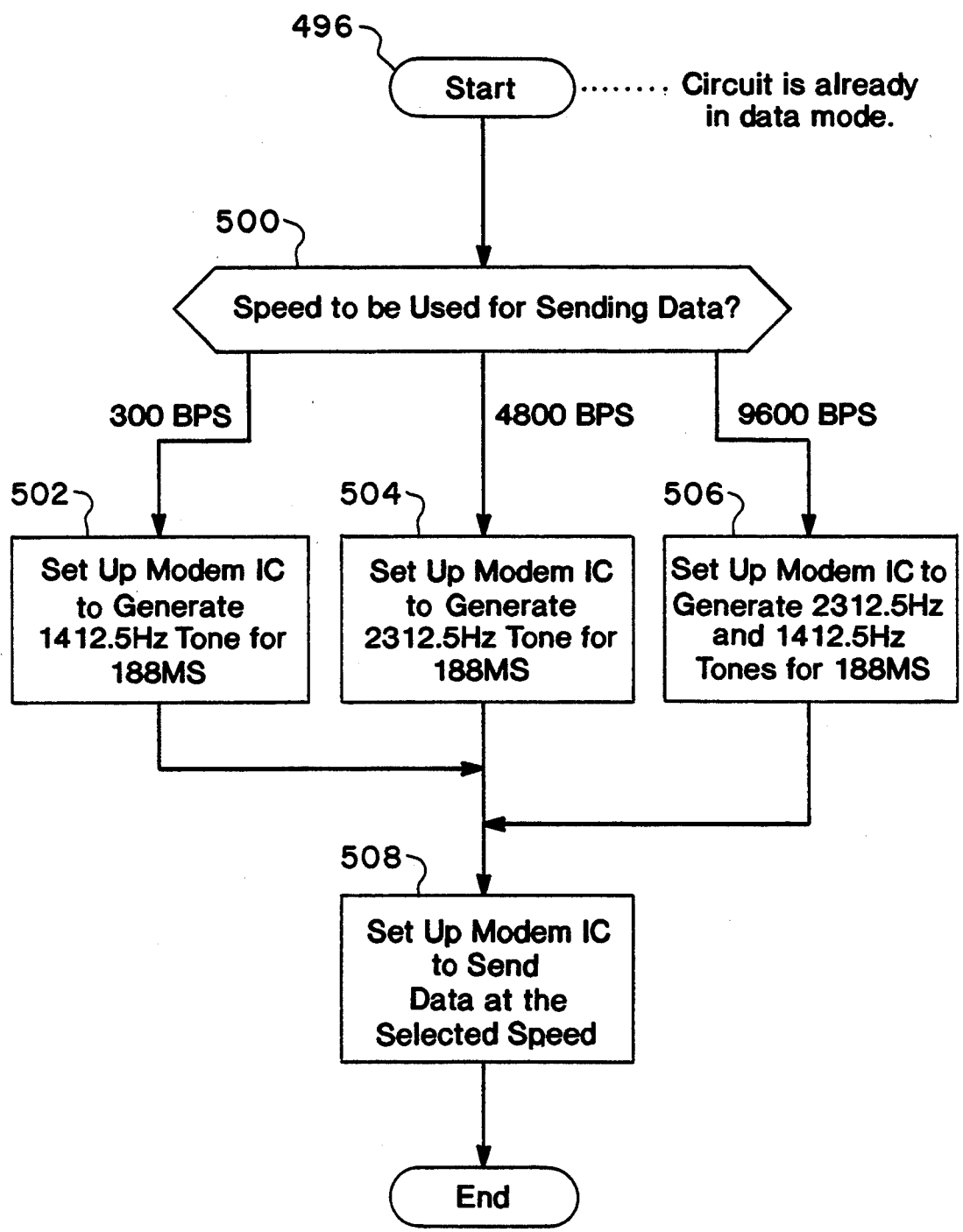
FIG. 21 is a flow diagram of the link turn around procedure for the terminal was just previously receiving data.

After receiving the visual data, the microcontroller 230 in the subscriber's terminal 14 turns the link around to transmit the acknowledgement data to the agent's terminal 100 according to the procedure in FIG. 21. Of course, having just received the visual data, the subscriber's terminal 14 is already in the data mode at the start 496 of the link turn around procedure. It first determines at step 500 which speed it will use to transmit the acknowledgement data according to the criteria discussed above. For a simple acknowledgement data transmission, which is usually very short, the 300 bps rate will probably be selected, so the modem IC 222 is set up at step 502 to transmit the single 2312.5 Hz tone for 188 ms to tell the agent's terminal that 300 bps will be the transmission speed. However, since the turn around link procedure may also be used for other purposes, or for transmitting back other and longer data, the steps 504 and 506 for setting up the modem IC 222 to transmit tones for 4,800 bps or 9,600 bps are also shown. Finally, after the speed tones are generated and sent, the microcontroller 230 proceeds to the final link turn around step 508 where it sets up the modem IC 222 to send the acknowledgement data.

Figure 22:
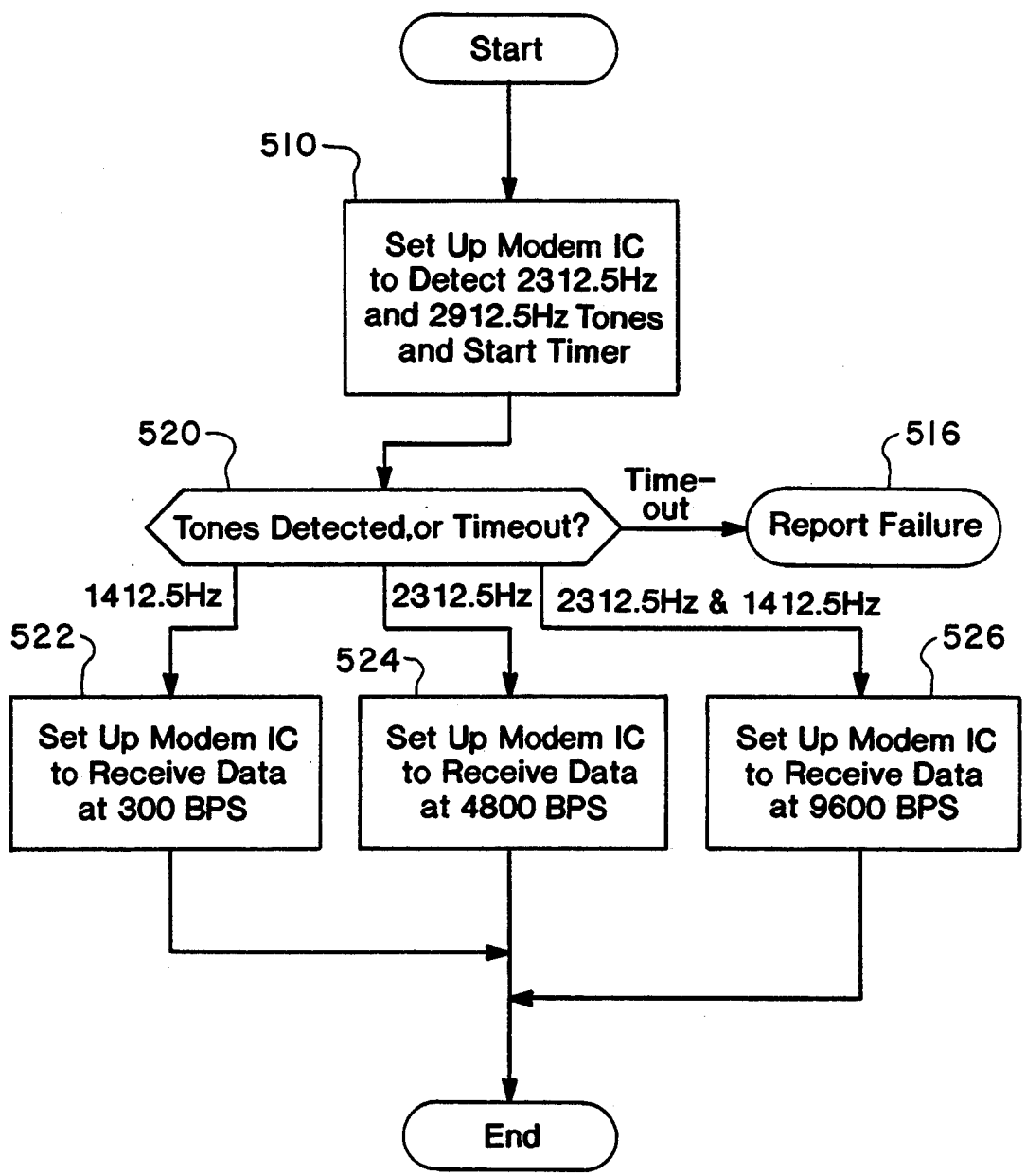
FIG. 22 is a flow diagram of the link turn around procedure for the terminal that was just previously sending data.

For the other terminal, i.e., the agent's terminal 100, the link turn around procedure is illustrated in FIG. 22. Essentially, as described above, after having sent the visual data, the microcontroller 330 of agent's terminal 100 sets up the modem IC 322 at step 510 to detect incoming speed tones at the 1412.5 Hz and 2312.5 Hz frequencies. It also starts the timer to measure the time elapsed from the set-up of the modem IC 322 until the speed tones are received.

The microcontroller 330 at step 520 determines which tones were detected, thus the speed of the acknowledgement data transmission coming. If the time has run out before this time, a failure is reported at step 516, which may initiate a retry or a return to the voice mode. However, if a single 1412.5 Hz tone is detected, step 522 sets the modem IC 322 to receive data at 300 bps. If a single 2312.5 Hz tone is detected, step 524 sets the modem IC 322 to receive data at 4,800 bps. If both 1412.5 Hz and 2312.5 Hz tones are received, step 526 sets the modem IC 322 to receive data at 9,600 bps. The data link is thereby completely turned around, and the agent's terminal 100 is ready to receive the acknowledgement or other data from the subscriber's terminal.

Figure 23:
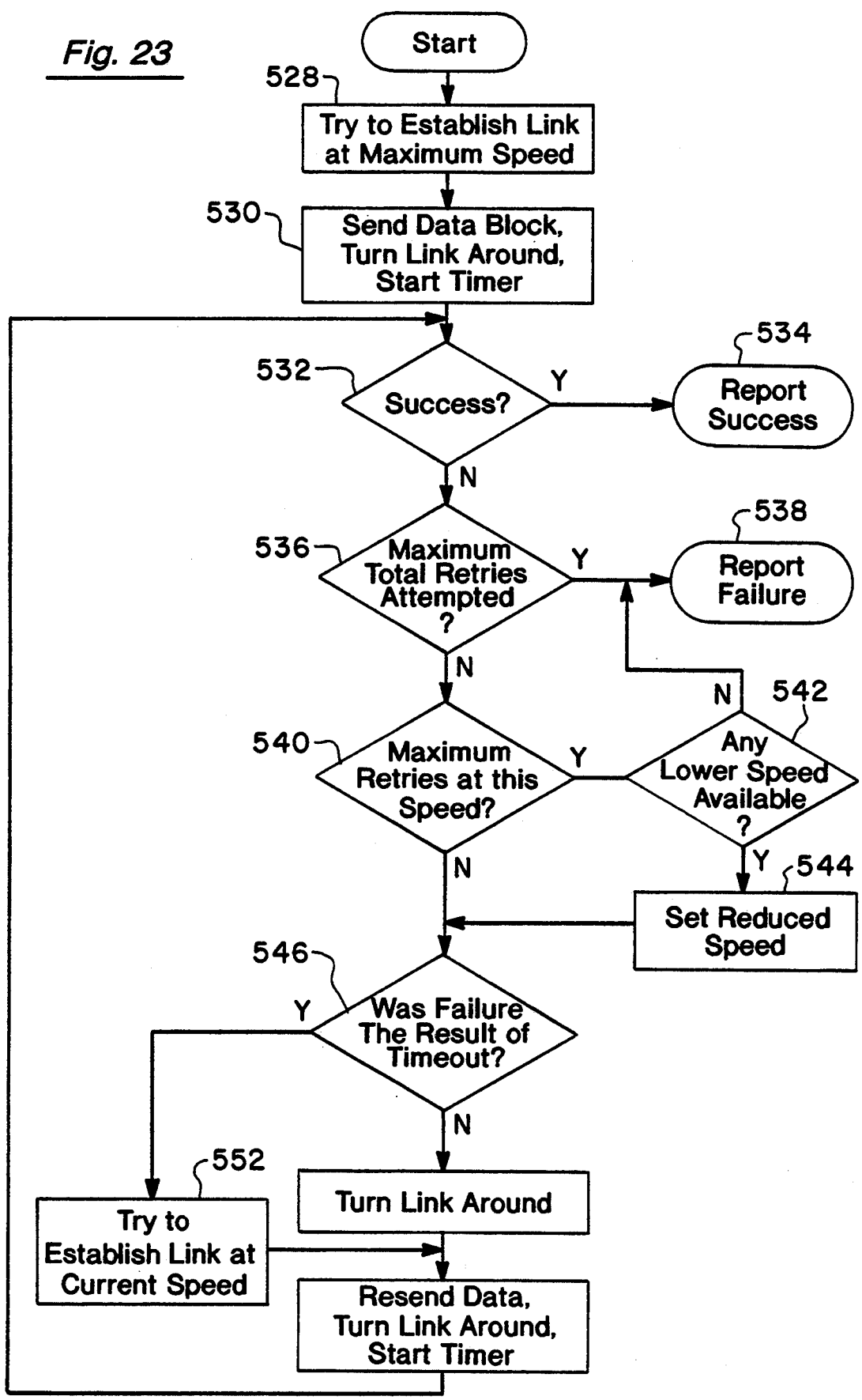
FIG. 23 is a flow diagram of the retry procedure for link establishment.

The retry strategy, according to this invention, is illustrated in FIG. 23. At step 528, the data link is established at maximum speed, according to the procedures illustrated in FIGS. 19 and 20, as described above. The maximum speed is 9,600 bps, which in this retry procedure is always the starting retry speed. However, it does not have to be set up this way, so that retries at initial lower speeds can also be used, for example, if the preceding transmissions had resulted in reduced speed retries. For example, once the speed has been reduced during a call, it is likely that the lower speed will have to be used in subsequent transmissions anyway, so it may be better to start with the lower speed.

In step 530, the block of data, such as the visual data is sent by the agent's terminal 100, and the receiving terminal, such as the subscriber's terminal 14, after receiving the data turns the link around to send the acknowledgement data back to the agent's terminal 100, as shown in FIG. 22 and described above. Also, as described above, the time is also set during the link turn around to indicate whether there is a failure.

If the transmit is a success at step 532, then the success is reported at 534, and the terminals 14 and 100 go back to voice mode. Success means that the link turn around procedure of FIG. 22 ended without failure and the response received from the subscriber's terminal 14 indicates that all data was received correctly. On the other hand, if a successful transmission is not determined at step 532, the retry procedures go to the next step 536 to query whether the number of retries has already reached a preset maximum, because it would be futile to continue retrying indefinitely to establish the data link and make a successful data transmission where it is obviously not working.

If the maximum total retries have been reached at step 536, then failure is reported at 538, so the terminal can return to voice mode. However, if the maximum number of retries have not been reached at step 536, the next step 540 queries whether the number of retries at this particular speed has reached a preset maximum for that speed. The purpose for this step is to allow a certain number of retries at the current transmission speed and then going to the next lower speed to retry a certain preset number of times at that speed, too. The idea is that a retry at lower speeds might work where higher speeds do not.

If the maximum number of retries at a certain speed has been reached, at step 540, then the next step 542 determines whether there are any lower speeds available. In other words, is the retry already operating at the lowest 300 bps rate, or is it still at one of the higher 4,800 bps or 9,600 bps speeds. If it is already down to 300 bps, so there is no lower speed available, then a failure is reported at 538 as before. However, if a lower speed is available, step 544 resets the modem IC transmission speed to the next lower speed, i.e., from 9,600 bps to 4,800 bps, or from 4,800 bps to 300 bps. Then the process continues to the next step 546 where a check is made to see whether the failure at step 532 was due to excessive time elapsed, again referring back to those time checks in the link turn around procedure in FIG. 22. Of course, if the maximum retries at the particular speed in step 540 have not been reached, the process would go immediately to the time-induced failure check of step 546.

If the failure at step 532 is determined at step 546 not to have been due to excessive time, the next step 548 is to turn the link around again, and then resend the data at step 550. Also at step 550, after the data has been resent, the link is turned around again, the time is restarted, and the process is then returned at step 532 to see if the last retry at sending the data was a success. On the other hand, if the step 546 determines the failure was due to excessive time, step 552 skips the turn around step of 548 and goes through implicit link establishment and data send operations again. A failure which is not the result of time out occurs when the response received from the subscriber's terminal 14 indicates that not all the data was received correctly. A failure which is the result of time out occurs when the agent's terminal 100 receives no response at all from the user's terminal 14.

Eventually, of course, this retry procedure will cycle enough to either report a success at 534 or a failure at 538. In either instance, the ultimate result will be to return the systems to voice mode.

Figure 24:
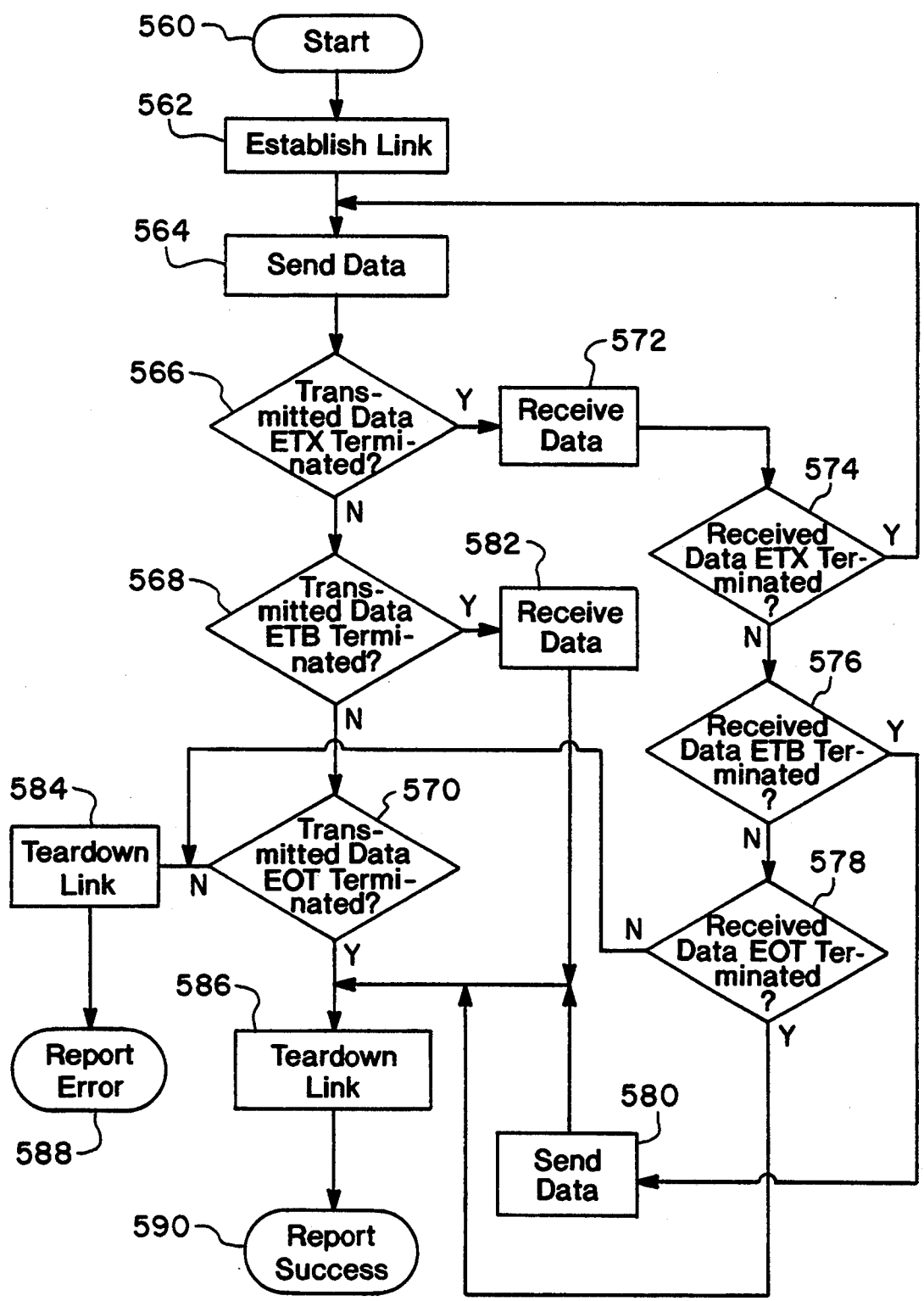
FIG. 24 is a flow diagram of the link tear down control.

The link tear down control utilized in this invention is shown in FIG. 24, which is illustrated from the standpoint of the terminal that initiates the data transmission. Therefore, for the purposes of this description, FIG. 24 is used to illustrate the link tear down control in the agent's terminal 100 (FIG. 11). It may be noted that the tear down control functions from the standpoint of the subscriber's terminal 14 (FIG. 11) are essentially the same as those illustrate in FIG. 24, except that the word "send" would be replaced by the word—receive—and vice versa.

The start step 560 means essentially that the agent executes the keystroke or clicks on the Window display that sends the signal to the microcontroller 330 in the agent's terminal saying it wants to send down some data, such as the visual data to be transmitted to the subscriber's terminal 14. Upon receipt of this "send" signal, the microcontroller 330 proceeds to step 562 to establish the data link, which was described above and illustrated in FIG. 19 and may include some or all of the retry procedure illustrated in FIG. 23. With the data link established, the microcontroller 330 instructs the modem IC 322 at step 564 to send the data, such as the visual data, to the subscriber's terminal 14.

In the protocol used in this invention, the application layer 216 of the agent's terminal 100 must decide before the end of data transmission whether no response, one response, or open-ended exchanges will be allowed. The term "response" as used for this purpose means a response from the peer application layer 206 of the subscriber's terminal 14, not the normal acknowledgement data that the data link layers 204 and 214 exchange to insure data integrity. For example, no response may be selected for the usual case in which the agent transfers a screen of data to be viewed by the subscriber, while one response might be appropriate for the agent who wishes retrieve some information from the subscriber's terminal 14 such as the amount of memory space available. Open ended exchanges may be selected when the protocol is used between two agent-type terminals which are being used in a back-and-forth transaction.

The protocol used in this invention, therefore, requires the agent's application layer 216 to inform the data link layer 214 of the responses expected from the subscriber's application layer 206 by, for example, terminating each data transmission with one of the following characters: ETX, ETB, or EOT. An ETX character is used to signal that an open-ended exchange is allowed. An ETB character indicates that one response is allowed. An EOT character indicates that no response is allowed. Therefore, the data link layer 214 of the agent's terminal 100 has to detect which response option, open ended (ETX), one response (ETB), or no response (EOT) has been selected and designated by the application layer 216 of the agent's terminal 100. This detection occurs in steps 566, 568, and 570 of the tear down control in FIG. 24.

In step 566, the microcontroller 330 checks the end of the data transmission that comes down from the application layer 216 to see if it has an ETX character at the terminal end of the data. If so, the microcontroller 330 at the agent's terminal cannot tell whether the current data transmission that just ended was the last one expected in an exchange or whether it should expect responding data to come back from the subscriber's terminal 14. Therefore, it does not start to tear down the data link. Instead, it leaves the agent's terminal 100 in the data mode and waits to receive data from the subscriber's terminal 14. On the other hand, if the current data transmission coming from the agent's application layer 216 is not terminated with an ETX character, the microcontroller 330 proceeds to the next step 568 to check for an ETB character, as will be described below.

If the ETX character was detected at step 566 and the data link is left intact, as described above, the next step 572 would be to receive the next data transmission from the subscriber's terminal 14. Since the subscriber's terminal 14 operates under the same protocol as the agent's terminal 100, any data transmission received from the subscriber's terminal 14 by the agent's terminal 100 at step 572 also has to end with one of the characters ETX, ETB, or EOT. Therefore, the agent's microcontroller 330 can also tell from the data transmission received from the subscriber's terminal 14 whether the data link is to be torn down.

Consequently, at step 574, the data received by agent's terminal 100 in step 572 from the subscriber's 14 terminal is checked by microcontroller 330 for the terminal character ETX. If ETX is present, then the microcontroller 330 still does not tear down the data link, and it leaves the agent's terminal 100 in the data mode ready to send more data, as determined by the application level 216. However, if the data received at step 572 does not terminate with an ETX, then the microcontroller 330 checks for an ETB in the next step 576. If an ETB is present, the indication is that the subscriber's terminal 14 expects to receive just one more response from the agent's terminal 100. Therefore, the microcontroller 330 keeps the agent's terminal 100 in the data mode for sending one more data transmission at step 580.

However, if there is no ETB detected at step 576, the microcontroller 330 goes to the next step 578 and checks for the EOT character. If the EOT character is not present, the indicator is that the end of the data transmission did not arrive. Therefore, the microcontroller 330 tears down the data link at step 584 to return to voice mode and reports an error at step 588 to the agent's display interface 80. However, if the EOT is detected at step 578, then the microcontroller 330 knows that nothing else is expected either from or to the subscriber's terminal 14, so it tears down the data link at step 586 and reports a success to the agent's display interface 80. At the same time, the subscriber's terminal 14 would also have already torn down its data link and returned to the voice mode in response to that same EOT character.

Returning now to step 568, where the original data transfer by the agent's terminal 100 to the subscriber's terminal 14 did not have an ETX, the microcontroller 330 checks for the ETB character at the end of the data transmission. If the ETB is present, then one more response is expected from the subscriber's terminal 14, so the data link is left intact to receive that response.

The expected one data response from the subscriber's terminal 14 is then received at step 582, and, upon receipt, the microcontroller 330 proceeds immediately to step 586 to tear down the link and return to voice mode. It also reports the successful data transfer at step 590 to the agent's display interface 80.

Finally, if there was no ETB at step 568, the microcontroller 330 checks for EOT in the data transmission at step 570. If EOT is not detected, it tears down the link to return to voice mode at step 584 and reports the error at step 588 to the agent's display interface 80. However, if the EOT is detected at step 570, the microcontroller 330 tears down the link at step 586 to return to voice mode and reports a successful data transfer to the agent's display interface 80.

As mentioned above, the subscriber's terminal 14 operates under the same protocol, so a separate description of the link tear down control for the subscriber's terminal 14 is not necessary. While the above description concentrates primarily on monodirection data transmission applications from an active agent to a passive user, because that is its primary purpose, it works equally as well in data transmission from either terminal, such as in bidirectional peer-to-peer data and voice communications. Also, the above description is a high level description to show the inventive concepts of this telecommunications system in a concise and understandable manner, as well as to enable persons skilled in this art to practice the invention. There are, of course, many more details involved in implementing the invention that are common and known to persons skilled in this art, such as implementing the HDLC protocol, details of the modem IC's presenting a suitable interface to the user, controlling the host computer to terminal link, data compression techniques, and the like.

The actual visual data transferred from the agent's terminal 100 to the subscriber's terminal 14 for visual display on the subscriber's screen or LCD 20 can be whatever data is displayed on the agent's computer display screen 64 and in the same format. However, it is preferable in many applications to transfer to the subscriber's terminal 14 only selected portions of the data displayed on the agent's screen 64 or to display the data in a different format or configuration on the subscriber's screen 20 from the way it appears on the agent's screen 64.

For example, many computer applications or software programs are designed and written to create output information for certain classes of professionals. Such outputs or displays, while useful, are often complex and may contain mnemonics that are readily understood by trained professionals, but which are not recognizable to lay persons, or they may contain certain data that is irrelevant to the subscriber along with relevant data that could be useful to many subscribers. Such screen displays may be difficult for the lay person to interpret and use, or they might even contain some confidential data that the agent would not want to disseminate to subscribers.

One way to avoid these problems, of course, would be to create the applications in the first place to display data in formats that are more useable to ordinary people. However, that approach may be very limiting to the use of the telecommunications system of this invention, which is directed primarily to bring data from more sophisticated sources to lay persons in a simple visual format that can be read and understood readily. It would also not be economical, feasible, or perhaps even legal without obtaining appropriate permission, to modify existing application software used by the more sophisticated professionals to make it more suitable for display by lay persons. Therefore, this invention also includes a formatting feature in the application layer 216 of the agent's terminal 100 for capturing selected data from a screen display of another application data source and reformatting the captured data into another display format, preferably more appropriate and easier for the subscriber or receiver to read and understand, before transmitting it to the subscriber's terminal 14. For purposes of this description, the screen display of data on the agent's terminal display device 64 from the original or originating application software is called the "source display", and the new, reformatted display of selected information captured from the source display is called the "target display".

Figure 25:
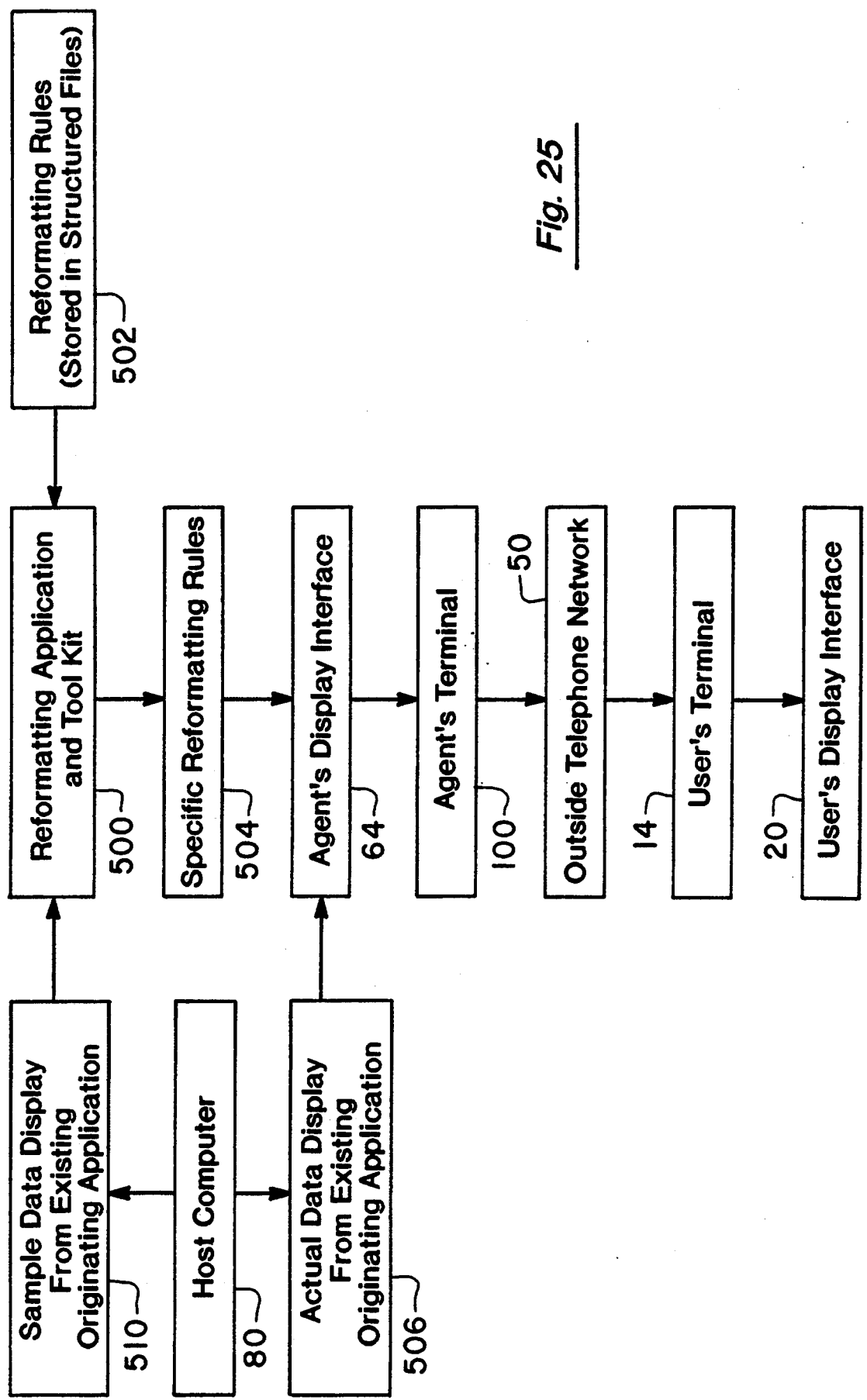
FIG. 25 is a block diagram of the display reformatting feature of this invention.

The reformatting application, according to this invention, is used as illustrated in FIG. 25. It assumes the existence of some originating application that gathers and displays data for the agent on the agent's terminal display 64, such as information stored in a data base or available to a host computer 80, some of which the agent may wish to show to his or her customers or subscribers. Before displaying such information to the subscriber, however, the agent or the owner of the agent's station 60 (FIG. 1), may want to reformat the display from the originating application and perhaps to eliminate some of the data from the display or add additional information, headings, addresses, dates, and the like. To do so, the agent or some administrator can call up the data onto his or her computer, which may be the agent's computer 64 or some other similar device, with the originating application in a normal manner. In this manner, the agent or administrator acquires a sample data display 610 from that existing application on his or her computer screen.

The agent or administrator then uses the reformatting application 600 according to this invention to capture selected data from the sample display 610 and apply selected reformatting rules from a set of such reformatting rules 602 that are stored in a structured file to create specific reformatting rules 504 that are to be applied to data displays from the originating application whenever such data are to be sent to a subscriber.

The custom specific reformatting rules 604 that are created for data displays from that originating data application in the host computer 80 are then implemented in the agent's display computer 64. Therefore, when the agent is conversing with a customer or subscriber via their telephones 12 and 62 and decides to show the subscriber some data from a data base, such as data available through the host computer 80, the agent calls up the actual data with the originating application 606, which is displayed on the agent's computer display 64 in its original format. When the agent initiates the "send" signal to transmit the data, the data display is automatically reformatted according to the specific reformatting rules 604 created for that kind of data display, before it goes to the agent's terminal 100 for transmission to the subscriber's terminal 14 via the telephone network 50, as described above. The data is, therefore, displayed on the subscriber's LCD or display screen 20 in the reformatted display.

The reformatting function is application independent, as it uses the screen captured application's display to create the target display. Many computer applications have been designed and written to create output information for a certain class of professionals. The output formats are often complex, contain mnemonics, contain irrelevant data, and are difficult for a nonprofessional to interpret. Data transfer, according to this invention, provides for timely data transfer during normal telephone conversations, and the on-the-fly reformatting is a way of presenting quality information without the need to change the originating application.

The reformatting is done by the routine that is running in the sending computer 64. These routines are customized to the operating environment (PC-DOS, UNIX, PC-Windows, etc.) and run seemlessly (unobtrusively) as background tasks. These routines use sets of structured rules 502 previously created. The person assigned to create the specific reformatted output rule sets 604 uses a toolkit to create them. These are then copied to the agent's computers 64, 68 where the agent software is installed.

When an existing application's output 606 is presented on the computer's display, and the agent initiates a transfer of this information to a subscriber's terminal 100, this reformatting application identifies the data 606 displayed, locates the specific formatting rule set associated with displays from that originating application, reformats the data from the display data 606, and then transfers the reformatted information to the subscriber's terminal 14. At the same time, the reformatted target display replaces the source display on the agent's computer screen 64, so the agent is looking at the same display as the subscriber.

This reformatting application and toolkit 600 use the existing applications' source output formats and create a newly formatted target output for the targeted subscriber without requiring time-consuming and expensive reprogramming of the existing applications. Using the toolkit does not require computer programming skills. When creating the reformatting rules, the effects of these reformatting rules can be reviewed during their creation. When satisfied with the final presentation, as a result of applying the selected rule sets 602, the resulting specific reformatting rules 604 or structure information is available to transfer to the agent's computers 64, 68 that are designated for running the agent's software. This reformatting application 600 runs in a Window's environment, and it uses an actual, or a representative, source data display to create and review the specific reformatting rules 604.

The toolkit 600 produces sets of specific rules 504 that are structured for high performance reformatting during the data-sending operation. These specific rules 604 are ordered according to an efficient and correct sequence of operations automatically by the toolkit 600, and without requiring knowledge of the syntax of the structures. The target display is created from the representative source display 610 within a Windows environment, similar to using a word processor. The correct rules are created by the toolkit using a unique design and set of algorithms, eliminating the need for direct programming and other editing interactions. These specific rules 604 are used during the data formatting operation, and they are applied to the application-produced screen displays. These structures are stored in three files, and in such a way so that the formatting application can use them with little additional processing.

The set of commands used within the toolkit 600 to create the formatting rules is divided into two modes of use. One mode is to create a target display using copy operations for the text components within the source display. The other mode is to transfer the source display in its entirety to the target and then make modifications to it. The first method is used for report creations that involve many complex transformations. The second method is used when the source screen is very close to acceptable for the target display and only a few minor clean-up actions are required. The specific structured rule sets 604 are applied to conditionally transfer, filter, enter, replace, or select textual components from the source display 606 for inclusion into the target display and to remove, replace, and enter text.

Most of the commands are conditional. This means that if certain text (string of characters) appears within a pre-selected range (rows and columns of the source display are identified for these commands), then the requested action is taken. If the text is not found, then the associated action is not taken. An example of a command's action is to enter a character string into a (relative) location in the target display. Another example is: when a mnemonic is located within a block of text in the source display, then enter a descriptive text string into the target display.

The commands operate in a relative manner, based upon a starting location (the row and column of the source display is identified). Actions taken will be relative to the starting position (the selected row and column) for the target display. For example, if a mnemonic is located within a block of the source display, the replacement description will be entered into the target at a row location relative to its starting row and at the column specified for the target. This allows a single formatting rule to be applied over a range of the source disk, lay and to correctly position the related information into the target screen.

The example in FIG. 26 demonstrates the action of two rules. The first rule enters the text string "Start" into the target display 620 when the string "ABC" is found within the source display 622. The second rule enters the string "End" into the target display 620 when the string "EFG" is found within the source display 622. The location (row and column) for the source display 622 is different from the target display's 620 row and column. The relative location for the text "Start" is maintained according to the position of "ABC" in the source display 622.

Commands used in the reformatting application 600 locate the same text on a screen with a starting row and a column number along with the numbers of the rows and columns to use. This format defines a rectangular block on the screen display. The target screen display location is defined with a row and a column position for the starting location of the block.

A number of formatting commands or rules are available in the formatting application of this invention, including "Copy Text", "Conditional or Replacement Copies", "Enter Text", "Remove a Block of Text," "Copy Entire Text", and "Remove Blank Lines".

The "Copy Text" command will cause the reformatting application to copy a specified block 624 of the text from the source screen display 622 to the target screen display 520, as illustrated in FIG. 27. The block 624 is defined on the source display screen 622 with a mouse (or by entering the numbers of the rows and columns from the keyboard). The desired location for the block 624 for target screen display 620 is entered from the keyboard by column and row designations.

The "Conditional or Replacement Copies" command causes a search for some specific text, mnemonic, or the like. If the search-for text is found within a specified block of the source display screen, then the reformatting application can do any of the following selected functions: (1) Copy the text to the target display; (2) Enter substitute text into the target, such as to replace a mnemonic with a more recognizable work; and (3) Enter an area of blanks on the display instead of the searched-for text, and the like.

The "Enter Text" command allows the agent or administrator to enter a new literal string or text, such as a heading, address, etc., into the target display that was not in the source display, as illustrated in FIG. 28.

The "Remove a Block of Text" command causes the reformatting application to completely remove a selected block of text from the source display. This command is useful when the source display contains a block of irrelevant information or data that the agent does not want the subscriber to see, while it allows other more relevant data to go from the source display into the target display.

The "Copy Entire Text" command simply incorporates the entire source screen display into the target display (same row and column locations).

The "Remove Blank Lines" command will move up lines in the target display, packing them into blank lines. This command may be used, for example, to fill up blanks in the target display that were created by the "Remove Block of Text" command described above.

Of course, other commands can also be provided to help reformat source displays, once the principles of this invention are understood.

Accordingly, a product and process are provided by this invention in which existing voice telephone communications are augmented in a manner that allows visual data reception and display by a passive subscriber or subscriber concurrent with, and almost simultaneous with, voice communication over a telephone line. The data transmission, as described above, is not technically simultaneous with voice communications, since there is a short voice disconnect and delay during data transmission, but the disconnect and automatic reconnect are so easily activated and used by the agent and almost completely passive to the subscriber or receiver, that it can almost be considered for practical purposes to be concurrent and simultaneous.

One multiplexing arrangement compatible with public switched telephone network 50 is described above, however, any compatible multiplexing arrangement is possible.

Accordingly, the foregoing is considered to be illustrative only of the principles and of an exemplary embodiment of the invention. Further, since numerous modifications and changes will readily occur to those skilled in the art, it is not desired to limit the invention to the exact construction and operation shown and described, and, accordingly all suitable modifications and equivalents may be resorted to falling within the scope of the invention as defined by the claims which follow.

The embodiment of the invention in which an exclusive property or privilege is claimed are defined as follows:

1. A telecommunication system for bidirectional communication of voice and visual data via a plain old telephone system (POTS) connection, comprising:
   an agent station having:
   (a) agent visual data generating means for generating agent visual data;
   (b) agent visual data display means for displaying visual data;
   (c) an agent telephone;
   (d) agent modem means for:
      (1) transmitting visual data from said agent visual data generating means into said POTS, including tone generator means for generating signal tones on said POTS associated with said agent visual data including a start tone to indicate that visual data is about to be transmitted, flag signals, and rate signals to indicate the rate at which said visual data will be transmitted on said POTS; and
      (2) receiving visual data from said POTS and transmitting it to said agent visual data display means, including tone detector means for detecting the start tone, flag signals and rate signals associated with said visual data received from said POTS;
   (e) agent directional coupler means positioned between said POTS, said agent telephone, and said agent modem means for transmitting signals bidirectionally between said POTS and said agent telephone, for transmitting signals from said POTS to said agent modem means, and for inhibiting signal transfer between said agent telephone and said agent modem means;
   (f) agent by-pass relay means positioned between said POTS and said agent directional coupler means for connecting and disconnecting said agent directional coupler and said agent telephone to and from said POTS; and
   (g) agent microcontroller means for actuating said agent by-pass relay means to disconnect said agent telephone from said POTS in response to being signalled by said agent modem means that a start tone has been received, and for responding to said rate signals received by said agent modem means by generating signals to set said agent modem means to receive data at the rate indicated by said received rate signals, and then reconnecting said agent telephone to said POTS after said visual data has been received; and
   a subscriber station having:
   (a) subscriber visual data generating means for generating subscriber visual data;
   (b) subscriber visual data display means for displaying visual data;
   (c) a subscriber telephone;
   (d) subscriber modem means for:
      (1) transmitting subscriber visual data from said subscriber visual data generating means into said POTS, including tone generator means for generating subscriber signal tones on said POTS associated with said subscriber visual data including a subscriber start tone to indicate that visual data is about to be transmitted, subscriber flag signals, and subscriber rate signals to indicate the rate at which said subscriber visual data will be transmitted on said POTS; and
      (2) receiving agent visual data from said POTS and transmitting it to said subscriber visual data display means, including tone detector means for detecting the agent start tone, agent flag signals and agent rate signals associated with said agent visual data received from said POTS;
   (e) subscriber directional coupler means positioned between said POTS, said subscriber telephone, and said subscriber modem means for transmitting signals bidirectionally between said POTS and said subscriber telephone, for transmitting signals from said POTS to said subscriber modem means, and for inhibiting signal transfer between said subscriber telephone and said subscriber modem means;
   (f) subscriber by-pass relay means positioned between said POTS and said subscriber directional coupler means for connecting and disconnecting said subscriber directional coupler and said subscriber telephone to and from said POTS; and
   (g) subscriber microcontroller means for actuating said subscriber by-pass relay means to disconnect said subscriber telephone from said POTS in response to being signalled by said subscriber modem means that said agent start tone has been received, and for responding to said agent rate signals received by said subscriber modem means by generating signals to set said subscriber modem means to receive data at the rate indicated by said agent rate signals, and then reconnecting said subscriber telephone to said POTS after said agent visual data has been received.

2. The telecommunication system of claim 1, wherein said agent modem means is set up to receive and demodulate said subscriber visual data and to send demodulated visual data to said agent microcontroller means, and wherein said agent microcontroller means is programmed to receive said demodulated subscriber visual data, to form the demodulated subscriber visual data into sets, and to transmit the sets of demodulated subscriber visual data to said agent visual data display means, and to recognize the end of a transmission of subscriber visual data.

3. The telecommunication system of claim 1, wherein said agent station further comprises agent local disconnect relay means positioned between said agent directional coupler means and said agent telephone for connecting and disconnecting said agent directional coupler means to and from said agent telephone, wherein said agent local disconnect relay means is connected to said agent microprocessor means, and wherein said agent microprocessor means is programmed to actuate said agent local disconnect relay means to disconnect said agent directional coupler means from said agent telephone in response to said subscriber start tone on said POTS.

4. The telecommunication system of claim 3, wherein said agent station further comprises agent local power supply/tone generator means connected to said agent local disconnect relay means for providing local power and local audio tone to said agent telephone when said agent local disconnect relay means is actuated to disconnect said agent telephone from said POTS.

5. The telecommunication system of claim 4, wherein said agent station includes agent high pass filter means positioned between said agent directional coupler means and said agent modem means for establishing a low frequency limit and for blocking frequencies lower than said low frequency limit from reaching said agent modem means.

6. The telecommunication system of claim 5, wherein said agent station includes agent limiter means for establishing a high amplitude limit and for prohibiting signal amplitudes high than said high amplitude limit from reaching said agent modem means.

7. The telecommunication system of claim 6, wherein said agent modem means includes agent automatic gain control means positioned between said agent limiter means and said agent tone detector means for adjusting amplitude of signals within limits acceptable to said agent tone detector means.

8. The telecommunication system of claim 7, wherein said agent station includes agent isolation relay means connected to said agent microcontroller means and positioned between said agent directional coupler means and said agent high pass filter means for isolating said agent modem means from said agent directional coupler means, said agent microcontroller means being programmed to actuate said agent isolation relay means to isolate said agent modem means from said agent directional coupler means when said subscriber start tone is detected on said POTS.

9. The telecommunication system of claim 8, wherein said agent station includes agent summing means positioned between said agent high pass filter means and said agent limiter means and between said agent by-pass relay means and said agent limiter means for connecting said agent modem means to said agent by-pass relay means, and for summing the signal output by said agent modem means with the output of said agent high pass filter means.

10. The telecommunication system of claim 9, wherein said agent by-pass relay means has a default mode in which said agent directional coupler means is connected to said POTS when said agent by-pass relay means is not powered, and wherein said agent local disconnect relay means has a default mode in which said agent telephone is connected to said agent directional coupler means when said agent local disconnect relay means is not powered.

11. The telecommunication system of claim 10, wherein said agent isolation relay means has a default mode in which said agent modem means is connected to said agent directional coupler means when said agent isolation relay means is not powered.

12. The telecommunication system of claim 11, wherein said agent modem means includes agent data transmitting means for transmitting an agent acknowledgement signal to said subscriber station upon receipt of said subscriber visual data by said agent station.

13. The telecommunication system of claim 1, wherein said subscriber modem means detects a telephone ring signal on said POTS and goes off-hook and said subscriber station further comprises memory means for receiving and storing said agent visual data for later delivery to said subscriber visual data display means.

14. The telecommunication system of claim 1, including an automatic answering and voice recording machine connected to said subscriber telephone for automatically going off-hook in response to a telephone ring signal on said POTS and for recording voice communications on said POTS.

15. A telecommunication system for sequentially transmitting voice and visual communications via a plain old telephone system (POTS) connection, comprising:
an agent station having:
(a) agent visual data generating means for generating agent visual data;
(b) agent transfer means connected to said agent visual data generating means for transmitting said agent visual data into said POTS; and
(c) agent tone generator means for generating signal tones on said POTS associated with said agent visual data including:
(1) an agent start tone to indicate that agent visual data is about to be transmitted;
(2) agent flag signals; and
(3) agent rate signals to indicate the rate at which said agent transfer means will transmit said agent visual data on said POTS; and
a subscriber station having:
(a) subscriber visual data display means for displaying agent visual data from said agent station;
(b) a subscriber telephone;
(c) subscriber modem means for receiving said agent visual data and transmitting it to said subscriber visual data display means, and including means for detecting said agent start tone, said agent flag signals and said agent rate signals;
(d) subscriber directional coupler means positioned between said POTS, said subscriber telephone, and said subscriber modem means for transmitting signals bidirectionally between said POTS and said subscriber telephone, for transmitting signals from said POTS to said subscriber modem means, and for inhibiting signal transfer between said subscriber telephone and said subscriber modem means;
(e) subscriber by-pass relay means positioned between said POTS and said subscriber directional coupler means for connecting and disconnecting said subscriber directional coupler and said subscriber telephone to and from said POTS; and
(f) subscriber microcontroller means for actuating said subscriber by-pass relay means to disconnect said subscriber telephone from said POTS in response to being signalled by said subscriber modem means that said agent start tone has been received, and for responding to said agent rate signals received by said subscriber modem means by generating signals to set said subscriber modem means to receive data at the rate indicated by said agent rate signals, and then reconnecting said subscriber telephone to said POTS after said agent visual data has been received.

16. The telecommunication system of claim 15, wherein said subscriber modem means is set up to receive and demodulate said agent visual data and to send demodulated visual data to said subscriber microcontroller means, and wherein said subscriber microcontroller means is programmed to receive said demodulated agent visual data, to form the demodulated agent visual data into sets, to transmit the sets of demodulated agent visual data to said subscriber visual data display means, and to recognize the end of a transmission of agent visual data.

17. The telecommunication system of claim 15, wherein said subscriber station further comprises subscriber local disconnect relay means positioned between said subscriber directional coupler means and said subscriber telephone for connecting and disconnecting said subscriber directional coupler means to and from and said subscriber telephone means, and wherein said subscriber local disconnect relay means is connected to said subscriber microprocessor means and said subscriber microprocessor means is programmed to actuate said subscriber local disconnect relay means to disconnect said subscriber directional coupler means from said subscriber telephone in response to said agent start tone on said POTS.

18. The telecommunication system of claim 17, wherein said subscriber station further comprises subscriber local power supply/tone generator means connected to said subscriber local disconnect relay means for providing local power and local audio tone to said subscriber telephone when said subscriber local disconnect relay means is actuated to disconnect said subscriber telephone from said POTS.

19. The telecommunication system of claim 17, wherein said subscriber by-pass relay means has a default mode in which said subscriber directional coupler means is connected to said POTS when said subscriber by-pass relay is not powered, and wherein said subscriber local disconnect relay means has a default mode in which said subscriber telephone is connected to said subscriber directional coupler means when said subscriber local disconnect relay means is not powered.

20. The telecommunication system of claim 15, further comprising subscriber limiter means for establishing a high amplitude limit and for prohibiting signal amplitudes higher than said high amplitude limit from reaching said subscriber modem means.

21. The telecommunication system of claim 20, wherein said subscriber modem means includes subscriber automatic gain control means positioned between said subscriber limiter means and said subscriber tone detector means for adjusting amplitude of signals within limits acceptable to said subscriber tone detector means.

22. The telecommunication system of claim 15, further comprising subscriber high pass filter means positioned between said subscriber directional coupler means and said subscriber modem means for establishing a low frequency limit and for blocking frequencies lower than said low frequency limit from reaching said subscriber modem means.

23. The telecommunication system of claim 22, wherein said subscriber transfer means includes subscriber isolation relay means connected to said subscriber microcontroller and positioned between said subscriber directional coupler means and said subscriber high pass filter means for isolating said subscriber modem means from said subscriber directional coupler means, said subscriber microcontroller being programmed to actuate said subscriber isolation relay means to isolate said subscriber modem means from said subscriber directional coupler means when said agent start tone is detected on said POTS.

24. The telecommunication system of claim 23, wherein said subscriber isolation relay means has a default mode in which said subscriber modem means is connected to said subscriber directional coupler means when said subscriber isolation relay means is not powered.

25. The telecommunication system of claim 15, wherein said start tone has a duration of about 200 milliseconds.

26. The telecommunication system of claim 15, wherein said subscriber modem means includes subscriber data transmitting means for transmitting a subscriber acknowledgement signal to said agent station upon receipt of said agent visual data by said subscriber station.

27. The telecommunication system of claim 15, wherein said agent transfer means includes:
agent modem means for modulating said agent visual data from said agent visual data generating means and sending the modulated visual data into said POTS, for modulating said agent flag signals and sending said agent flag signals into said POTS, and for generating tones for use as said agent start tone and for use as said agent rate signals; and
agent microcontroller means connected to said agent modem means for generating said agent flag signals, for controlling actuation and deactuation of said agent modem means to modulate and send said agent flag signals, and for controlling actuation and deactuation of said agent modem means to generate and send said agent start tone and said agent rate signals.

28. The telecommunication system of claim 27, wherein said agent modem means includes first agent tone generator means for producing a tone having a first frequency and second agent tone generator means for producing a tone having a second frequency, and wherein said subscriber modem means includes first subscriber tone detector means for detecting a tone having said first frequency and second subscriber tone detector means for detecting a tone having said second frequency.

29. The telecommunication system of claim 28, wherein said agent microcontroller means is programmed to actuate said first agent tone generator and said second agent tone generator simultaneously to produce simultaneous tones having said first frequency and said second frequency, respectively, to comprise said agent start tone.

30. The telecommunication systems of claim 28, wherein said first frequency and said second frequency are both in the range of about 300 to 3,300 Hz.

31. The telecommunication system of claim 28, wherein said first frequency is about 2,312.5 Hz.

32. The telecommunication system of claim 28, wherein said second frequency is about 2,912.5 Hz.

33. The telecommunication system of claim 27, wherein said flag signal includes six bytes of data.

34. The telecommunication system of claim 27, wherein a byte of said flag signal comprises a 01111110 byte.

35. The telecommunication system of claim 27, wherein said agent microcontroller means is programmed to actuate said agent modem means to modulate and transmit data after said agent modem means produces said agent start tone and then sequentially to produce said agent flag signal for modulation and transmission by said agent modem means.

36. The telecommunication system of claim 27, wherein said agent modem means and said subscriber modem means both have selectable low, medium, and high data transmitting and receiving rates.

37. The telecommunication system of claim 36, wherein said low data transmitting and receiving rate is about 300 bits per second.

38. The telecommunication system of claim 36, wherein said medium data transmitting and receiving rate is about 4,800 bits per second.

39. The telecommunication system of claim 36, wherein said high data transmitting and receiving rate is about 9,600 bits per second.

40. The telecommunication system of claim 36, wherein said agent microcontroller is programmed to actuate said agent modem means for transmitting said agent flag signals at said low rate.

41. The telecommunication system of claim 40, wherein said subscriber microcontroller means is programmed to actuate said subscriber modem means to receive and demodulate data in response to said agent start signal.

42. The telecommunication system of claim 41, wherein said subscriber microcontroller means is programmed to actuate said subscriber modem means to receive and demodulate data at said low rate in response to said agent start signal.

43. The telecommunication system of claim 42, wherein said agent microcontroller means is programmed to reconfigure said agent modem means after said agent flag signals are transmitted to produce and transmit said agent rate signal on said POTS.

44. The telecommunication system of claim 43, wherein said subscriber microcontroller means is programmed with a time limit and is programmed to determine whether said agent rate signal is received by said subscriber modem means within said time limit from when said subscriber microcontroller means reconfigures said subscriber modem means to actuate first and second subscriber tone detector means and, if not, to return said subscriber station to a voice mode by outputting signals to actuate said subscriber by-pass relay means, said subscriber local disconnect relay means, and said subscriber isolation relay means to reconnect said subscriber telephone to said POTS, to disconnect said subscriber visual data receiving means from said POTS, and to disconnect said subscriber local power supply/tone generator means from said subscriber telephone.

45. The telecommunication system of claim 41, wherein said subscriber microcontroller means is programmed with a time limit and is programmed to determine whether said agent flag signals are received by said subscriber modem means within said time limit from when said subscriber microcontroller means reconfigures said subscriber modem means to receive data and, if not, to return said subscriber station to a voice mode by outputting signals to actuate said subscriber by-pass relay means, said subscriber local disconnect relay means, and said subscriber isolation relay means to reconnect said subscriber telephone to said POTS, to disconnect said subscriber visual data receiving means from said POTS, and to disconnect said subscriber local power supply/tone generator means from said subscriber telephone.

46. The telecommunication system of claim 15, wherein said subscriber modem means detects a telephone ring signal on said POTS and goes off-hook and said subscriber station further comprises memory means for receiving and storing said agent visual data for later delivery to said subscriber visual data display means.

47. The telecommunication system of claim 15, including an automatic answering and voice recording machine connected to said subscriber telephone for automatically going off-hook in response to a telephone ring signal on said POTS and for recording voice communications on said POTS.

48. The telecommunication system of claim 15, wherein said subscriber visual display means includes an agent computer with source data generating means for generating a source display of visual source data, and reformatting means for capturing designated portions of said source display and for converting the captured portions into a target display of said agent visual data, which target display has different visual content and appearance than said source display.

49. The telecommunication system of claim 48, wherein said agent visual data generating means includes agent visual data display means connected to said agent computer for displaying said source display in a visually perceptible manner, and wherein said agent computer includes a data interface port connected to said agent transfer means, an interface circuit for feeding said agent visual data to said data interface port and to said agent transfer means, and agent send actuating means for actuating said reformatting means to capture said designated portions of said source display and to convert them to said target display and for actuating said interface circuit to feed said target display as agent visual data to said agent transfer means.

50. The telecommunication system of claim 48, wherein said reformatting means is actuateable to copy data in designated portions of said source display and to insert said data into designated portions of said target display.

51. The telecommunication system of claim 48, wherein said reformatting means includes conditional criteria for comparing to data in said designated portions of said source display and screening means for prohibiting copying of data that does not meet said conditional criteria into said target display.

52. The telecommunication system of claim 48, wherein said reformatting means includes conditional criteria for comparing to data in said designated portions of said source display and to substitute character strings for insertion into said target display instead of said data in said designated portions of said source display that meet said conditional criteria.

53. The telecommunication system of claim 48, wherein said agent computer includes auxiliary agent data entry means for entering additional data into said target display that is not in said source display.

54. The telecommunication system of claim 53, wherein said auxiliary agent data entry means includes a keyboard connected to said agent computer.

55. The telecommunication system of claim 15, wherein said agent tone generator means produces an agent termination character at the end of each agent visual data.

56. The telecommunication system of claim 55, wherein said agent microcontroller means is programmed to select said low data transmitting and receiving rate when said agent visual data is shorter than a threshold data length and to select a data transmitting and receiving rate that is faster than said low data transmitting and receiving rate when said agent visual data is at least as long as said threshold data length.

57. The telecommunication system of claim 56, wherein said threshold data length is about four characters.

58. The telecommunication system of claim 56, wherein said agent microcontroller means is programmed to detect said agent termination character, to determine the length of said agent visual data preceding said agent termination character, to compare the length of said agent visual data to said threshold data length, and to actuate said agent modem means to produce said agent rate signal that is indicative of the selected data transmitting and receiving rate.

59. The telecommunication system of claim 58, wherein said agent rate signal comprises simultaneous tones having both said first and said second tone frequencies to indicate said high data transmitting and receiving rate.

60. The telecommunication system of claim 58, wherein said agent rate signal comprises a single tone having said first tone frequency to indicate said low data transmitting and receiving rate.

61. The telecommunication system of claim 58, wherein said agent rate signal comprises a single tone generated at said second tone frequency to indicate said medium data transmitting and receiving rate.

62. The telecommunication system of claim 55, wherein said subscriber microcontroller means is programmed to recognize said agent termination character as being indicative of the end of said agent visual data and to generate a subscriber acknowledgement signal in response to said agent termination character and to send said subscriber acknowledgement signal to said subscriber modem means for modulation and transmission on said POTS.

63. The telecommunication system of claim 62, wherein said subscriber microcontroller means is also programmed to generate a success report in response to said agent termination character for display on said subscriber visual data display means.

64. The telecommunication system of claim 62, wherein said subscriber microcontroller means is also programmed to recognize when said agent termination character is not at the end of said agent visual data received by said subscriber transfer means and to generate an error report for display on said subscriber visual data display means.

65. The telecommunication system of claim 62, wherein said subscriber microcontroller means is programmed to reconfigure said subscriber modem means in response to said agent termination character to generate and transmit on said POTS a subscriber rate signal that is indicative of said low rate, then to reconfigure said subscriber modem means again to transmit data at said low rate, and to produce said subscriber acknowledgement signal in data form to said subscriber modem means for transmission on said POTS.

66. The telecommunication system of claim 65, wherein said agent modem means is also for detecting subscriber ram signals on said POTS and for distinguishing characteristics of subscriber rate signals that are indicative respectively of said low, medium, and high data transmitting and receiving rates, and for signaling said agent microcontroller means in a manner that reflects said rate distinguishing characteristics of the subscriber rate signals detected.

67. The telecommunication system of claim 66, wherein said agent microcontroller means is programmed to recognize the rate distinguishing characteristics of the subscriber rate signals and to reconfigure said agent modem means to receive said acknowledgement signal data at the data transmitting and receiving rate indicated by said subscriber rate signal.

68. The telecommunication system of claim 66, wherein said agent microcontroller means is programmed with a maximum acknowledgement time limit and to measure time elapsed from said reconfiguring of said agent modem means for detecting said subscriber rate signal, and wherein said microcontroller means is also programmed to initiate a retry procedure when said time elapsed exceeds said maximum acknowledgement time limit by resending said agent start tone, said agent flag signals, and said agent visual data in sequence to said subscriber station and then to reconfigure again said agent modem means for detecting said subscriber rate signal.

69. The telecommunication system of claim 68, wherein said agent microcontroller means is programmed to reconfigure said agent modem means to transmit said agent visual data at a first retry rate at least as high as the rate at which said agent visual data was transmitted initially for a predetermined number of said retry procedures.

70. The telecommunication system of claim 69, wherein said agent microcontroller means is programmed to reconfigure said agent modem means to transmit said agent visual data a predetermined number of times at a second retry rate lower than said first retry rate if none of said retries at said first retry rate result in receipt of said subscriber rate signal by said agent modem means, and to reconfigure said agent modem means after each such retry at said second retry rate for detecting said subscriber rate signal and to terminate said retry procedure whenever said subscriber rate signal is detected by said agent modem means.

71. The telecommunication system of claim 70, wherein said agent microcontroller means is programmed to terminate said retry procedure when said agent visual data has been transmitted at said second retry rate a preset number of times without detecting said subscriber rate signal.

72. The telecommunication system of claim 55, wherein said subscriber station includes subscriber visual data generating means connected to said subscriber microcontroller means for generating subscriber visual data, said subscriber visual data being programmed to produce an agent termination character at the end of each subscriber visual data.

73. The telecommunication system of claim 72, wherein said agent termination character and said subscriber termination character is any one of the characters ETX, ETB, EOT, wherein said ETX character signals that an open-ended exchange of data is allowed between said agent station and said subscriber station, said ETB character signals that one data response is allowed from said subscriber station, and said EOT character indicates that no data response from said subscriber station is allowed.

74. The telecommunication system of claim 73, wherein said agent microcontroller means is programmed to detect and distinguish whether said agent termination character is an ETX, ETB, or EOT, character.

75. The telecommunication system of claim 74, wherein said agent microcontroller means is programmed to reconfigure said agent modem means to detect a subscriber rate signal on said POTS in response to an ETX character after said agent visual data is transmitted and then to reconfigure said agent modem means in response to said subscriber rate signal to receive subscriber visual data from said subscriber station on said POTS at the rate indicated by said subscriber rate signal.

76. The telecommunication system of claim 75, wherein said agent microcontroller means is programmed to determine whether said subscriber termination character at the end of said subscriber visual data is an ETX character, and, if it is an ETX character, then to leave said agent modem means configured to transmit data.

77. The telecommunication system of claim 76, wherein said agent microcontroller means is programmed to determine whether said subscriber termination character at the end of said subscriber visual data is an ETB character, if it is not an ETX character, and if it is an ETB character, then to leave said agent modem means configured to transmit data.

78. The telecommunication system of claim 77 wherein said agent microcontroller means is programmed to determine whether an EOT character is present at the end of said subscriber visual data, if an ETB character is not detected, and, if not, to terminate data transfer and reception by said agent station.

79. The telecommunication system of claim 78, wherein said agent microcontroller means is programmed to terminate data transfer and reception by said agent station if an EOT character is detected at the end of said subscriber visual data.

80. The telecommunication system of claim 79, said agent visual data generator means is programmed to produce one additional agent visual data after said ETB character at the end of said subscriber visual data is detected, and wherein said agent microcontroller means is programmed to cause said agent modem means to transmit said additional agent visual data on said POTS and then to terminate said data transfer and reception by said agent station, while said subscriber microcontroller means is programmed to reconfigure said subscriber modem means to receive said additional agent visual data and transfer it to said subscriber visual display means and then to convert the subscriber station to a subscriber voice mode.

81. The telecommunication system of claim 80, wherein said agent microcontroller means is programmed to reconfigure said agent modem to receive data in response to detection of said ETB character at the end of said agent visual data, said subscriber microcontroller means is programmed to reconfigure said subscriber modem means to transmit one additional subscriber visual data and then to convert the subscriber station to a subscriber voice mode, and said agent microcontroller means is programmed to terminate data transfer and reception by said agent station after reception of said additional subscriber visual data.

82. The telecommunication system of claim 81, wherein said agent microcontroller means is programmed to terminate data transfer and reception by said agent station when said EOT character is not detected at the end of said agent visual data.

83. The telecommunication system of claim 82, wherein said agent microcontroller means is programmed to terminate data transfer and reception by said agent station when said EOT character is detected at the end of said agent visual data.

* * * * *